United States Patent
Bala et al.

(10) Patent No.: US 10,667,546 B2
(45) Date of Patent: Jun. 2, 2020

(54) PREPARATION AND INCORPORATION OF CO-PRODUCTS INTO BEVERAGES TO ENHANCE NUTRITION AND SENSORY ATTRIBUTES

(71) Applicant: PepsiCo, Inc., Purchase, NY (US)

(72) Inventors: Sundar Bala, Arlington Heights, IL (US); Bryan William Hitchcock, Mundelein, IL (US); MongJan Hsieh, Northbrook, IL (US); Rachel Lisa Jordan, Palatine, IL (US); Jeffrey David Mathews, Naperville, IL (US); Teodoro Rivera, Algonquin, IL (US); Jin-E Shin, Hoffman Estates, IL (US); William B. Small, II, Crystal Lake, IL (US)

(73) Assignee: PepsiCo, Inc., Purchase, NY (US)

( * ) Notice: Subject to any disclaimer, the term of this patent is extended or adjusted under 35 U.S.C. 154(b) by 354 days.

(21) Appl. No.: 14/766,828

(22) PCT Filed: Feb. 7, 2014

(86) PCT No.: PCT/US2014/015326
§ 371 (c)(1),
(2) Date: Aug. 10, 2015

(87) PCT Pub. No.: WO2014/126806
PCT Pub. Date: Aug. 21, 2014

(65) Prior Publication Data
US 2016/0000130 A1 Jan. 7, 2016

Related U.S. Application Data

(60) Provisional application No. 61/765,274, filed on Feb. 15, 2013.

(51) Int. Cl.
*A23L 2/02* (2006.01)
*A23L 2/04* (2006.01)
(Continued)

(52) U.S. Cl.
CPC .............. *A23L 2/02* (2013.01); *A23L 2/04* (2013.01); *A23L 2/52* (2013.01); *A23L 33/22* (2016.08); *A23V 2002/00* (2013.01)

(58) Field of Classification Search
None
See application file for complete search history.

(56) References Cited

U.S. PATENT DOCUMENTS 2,595,181 A   4/1952   Vincent
2,596,662 A   5/1952   Ducker
(Continued)

FOREIGN PATENT DOCUMENTS

CN   1909805    2/2007
CN   101715947  6/2010
(Continued)

OTHER PUBLICATIONS

Ames: WO2012045045 A1; published Apr. 5, 2012.*
(Continued)

*Primary Examiner* — Patricia A George
(74) *Attorney, Agent, or Firm* — G. Peter Nichols; Barnes & Thornburg LLP

(57) ABSTRACT

Co-products from juice extraction, in particular for use in beverage and food products to enhance nutrition and sensory attributes of the products, are provided. The co-product has a number average particle size of between 1 and 2000 microns, a total polyphenol content of at least 2500 parts per million, a moisture content of between 70% and 85% by weight, and a combined peel and seed content between 0.01% and 20% by weight.

10 Claims, 2 Drawing Sheets

(51) Int. Cl.
  *A23L 2/52* (2006.01)
  *A23L 33/22* (2016.01)

(56) References Cited

U.S. PATENT DOCUMENTS

| | | |
|---|---|---|
| 3,037,975 A | 6/1962 | Cohn |
| 3,118,770 A | 1/1964 | Harrell |
| 3,404,012 A | 10/1968 | Walton |
| 3,860,734 A | 1/1975 | Huth |
| 3,959,518 A | 5/1976 | Vincent |
| 3,966,984 A | 6/1976 | Cocke |
| 3,973,051 A | 8/1976 | Buckley |
| 4,016,351 A | 4/1977 | Eschinasi |
| 4,113,573 A | 9/1978 | Gerow |
| 4,241,093 A | 12/1980 | Farag |
| 4,259,252 A | 3/1981 | Perry |
| 4,304,768 A | 12/1981 | Staub |
| 4,313,372 A | 2/1982 | Gerow |
| 4,377,520 A | 3/1983 | Howell |
| 4,413,017 A | 11/1983 | Loader |
| 4,488,912 A | 12/1984 | Milch |
| 4,497,838 A | 2/1985 | Bonnell |
| 4,503,079 A | 3/1985 | King |
| 4,525,172 A | 6/1985 | Eriksson |
| 4,526,794 A | 7/1985 | Altomare |
| 4,565,702 A | 1/1986 | Morley |
| 4,587,126 A | 5/1986 | Patton |
| 4,644,905 A | 2/1987 | Vierling |
| 4,690,827 A | 9/1987 | Kupper et al. |
| 4,747,881 A | 5/1988 | Shaw |
| 4,774,099 A | 9/1988 | Feeney |
| 4,810,517 A | 3/1989 | Glittenberg |
| 4,830,862 A | 5/1989 | Braun et al. |
| 4,842,877 A | 6/1989 | Tyson |
| 4,865,863 A | 9/1989 | Prosise |
| 4,871,569 A | 10/1989 | Anderson |
| 4,876,102 A | 10/1989 | Feeney |
| 4,895,729 A | 1/1990 | Powrie |
| 4,925,686 A | 5/1990 | Kastin |
| 4,952,504 A | 8/1990 | Pavilon |
| 4,959,227 A | 9/1990 | Amer |
| 4,971,823 A | 11/1990 | Fahlen |
| 4,988,530 A | 1/1991 | Hoersten et al. |
| 5,007,334 A | 4/1991 | Kobes |
| 5,008,254 A | 4/1991 | Weibel |
| 5,024,996 A | 6/1991 | Ringe |
| 5,034,378 A | 7/1991 | Cox |
| 5,073,397 A | 12/1991 | Tarr |
| 5,099,009 A | 3/1992 | Thibault |
| 5,106,634 A | 4/1992 | Thacker |
| 5,137,744 A * | 8/1992 | Cagley .................. A21D 2/366 127/43 |
| 5,162,128 A | 11/1992 | Mills |
| 5,196,222 A | 3/1993 | Kirk |
| 5,202,122 A | 4/1993 | Graves |
| 5,232,726 A | 8/1993 | Clark |
| 5,234,704 A | 8/1993 | Devine |
| 5,260,086 A | 11/1993 | Downton et al. |
| 5,312,636 A | 5/1994 | Myllymaki |
| 5,385,748 A | 1/1995 | Bunger |
| 5,403,612 A | 4/1995 | Huang |
| 5,472,952 A | 12/1995 | Smidt |
| 5,474,793 A | 12/1995 | Meyer |
| 5,480,788 A | 1/1996 | Devic |
| 5,567,424 A | 10/1996 | Hastings |
| 5,567,462 A | 10/1996 | Ehrlich |
| 5,612,074 A | 3/1997 | Leach |
| 5,616,355 A | 4/1997 | Haast |
| 5,627,269 A | 5/1997 | Herak |
| 5,639,494 A | 6/1997 | Grassin |
| 5,656,310 A | 8/1997 | Santillo, Jr. |
| 5,690,981 A | 11/1997 | Watanabe |
| 5,738,887 A | 4/1998 | Wu |
| 5,759,704 A | 6/1998 | Horiuchi |
| 5,766,662 A | 6/1998 | Inglett |
| 5,773,075 A | 6/1998 | Todd |
| 5,817,381 A | 10/1998 | Chen |
| 5,837,311 A | 11/1998 | Zelkha |
| 5,861,178 A | 1/1999 | Burgin |
| 5,927,187 A | 7/1999 | Bosch |
| 5,932,265 A | 8/1999 | Morgan |
| 5,958,474 A | 9/1999 | Lee |
| 5,964,983 A | 10/1999 | Dinand |
| 6,019,851 A | 2/2000 | Pittet |
| 6,020,016 A | 2/2000 | Castleberry |
| 6,022,580 A | 2/2000 | Akatsuka |
| 6,083,582 A | 7/2000 | Chen |
| 6,151,799 A | 11/2000 | Jones |
| 6,183,806 B1 | 2/2001 | Ficca |
| 6,361,818 B2 | 3/2002 | Biyani |
| 6,383,546 B1 | 5/2002 | Powrie |
| 6,506,435 B1 | 1/2003 | Lundberg |
| 6,523,496 B1 | 2/2003 | Keithly |
| 6,645,546 B2 | 11/2003 | Roney |
| 6,730,343 B2 | 5/2004 | Chung |
| 6,753,019 B1 | 6/2004 | Lang |
| 6,787,172 B2 | 9/2004 | McArdle |
| 6,830,771 B2 | 12/2004 | Lanter |
| 6,841,181 B2 | 1/2005 | Jager |
| 6,890,578 B1 | 5/2005 | Takahasi |
| 7,052,725 B2 | 5/2006 | Chang et al. |
| 7,074,300 B2 | 7/2006 | Lundberg |
| 7,094,317 B2 | 8/2006 | Lundberg |
| 7,485,332 B2 | 2/2009 | Chu |
| 7,560,132 B2 | 7/2009 | Newkirk |
| 7,563,471 B2 | 7/2009 | Keithly |
| 7,576,070 B2 | 8/2009 | Kunz |
| 7,582,213 B2 | 9/2009 | Lundberg |
| 7,629,010 B2 | 12/2009 | Passarelli |
| 7,833,558 B2 | 11/2010 | Larsen |
| 7,879,379 B1 | 2/2011 | Widmer |
| 7,887,862 B2 | 2/2011 | Paz Briz |
| 7,910,338 B2 | 3/2011 | Hennessey |
| 8,017,171 B2 | 9/2011 | Sample |
| 8,021,520 B2 | 9/2011 | Yao |
| 8,034,286 B2 | 10/2011 | Janssen |
| 8,673,382 B2 | 3/2014 | Jordan |
| 2001/0012525 A1 | 8/2001 | Mann |
| 2001/0016220 A1 | 8/2001 | Jager |
| 2001/0046550 A1 | 11/2001 | Wadsworth |
| 2001/0053404 A1 | 12/2001 | William |
| 2002/0034563 A1 | 3/2002 | Grassin |
| 2002/0054924 A1 | 5/2002 | Leahy |
| 2002/0127319 A1 | 9/2002 | Gare |
| 2003/0040489 A1 | 2/2003 | Tanaka |
| 2003/0049360 A1 | 3/2003 | Zietlow |
| 2003/0064140 A1 | 4/2003 | Lineback |
| 2003/0068357 A1 | 4/2003 | Vala |
| 2003/0068429 A1 | 4/2003 | Frippiat |
| 2003/0144245 A1 | 7/2003 | Addis |
| 2003/0194473 A1 | 10/2003 | Redding |
| 2004/0022877 A1 | 2/2004 | Green |
| 2004/0081734 A1 | 4/2004 | Lang |
| 2004/0081741 A1 | 4/2004 | Levi |
| 2004/0086626 A1 | 5/2004 | Lundberg |
| 2004/0126474 A1 | 7/2004 | Letourneau |
| 2004/0170731 A1 | 9/2004 | Subramaniam |
| 2004/0213886 A1 | 10/2004 | Toves |
| 2004/0265451 A1 | 12/2004 | Rooks |
| 2004/0265465 A1 | 12/2004 | Daniels |
| 2005/0074542 A1 | 4/2005 | Lundberg |
| 2005/0089614 A1 | 4/2005 | Jones |
| 2005/0089620 A1 | 4/2005 | Bialek |
| 2005/0106308 A1 | 5/2005 | Rudie |
| 2005/0112242 A1 | 5/2005 | Hessel |
| 2005/0118233 A1 | 6/2005 | Segal |
| 2005/0118326 A1 | 6/2005 | Anfinsen |
| 2005/0158541 A1 | 7/2005 | Tanaka |
| 2005/0169970 A1 | 8/2005 | Aquino |
| 2005/0175672 A1 | 8/2005 | Kleutz |
| 2005/0202149 A1 | 9/2005 | McClements |
| 2005/0271790 A1 | 12/2005 | Aronson |
| 2005/0274469 A1 | 12/2005 | Lundberg |
| 2006/0062862 A1 | 3/2006 | Haber |

(56) References Cited

U.S. PATENT DOCUMENTS

| | | |
|---|---|---|
| 2006/0093720 A1 | 5/2006 | Tatz |
| 2006/0099277 A1 | 5/2006 | Jewett, Jr. |
| 2006/0115564 A1 | 6/2006 | Passarelli |
| 2006/0180547 A1 | 8/2006 | Widmer |
| 2006/0182820 A1 | 8/2006 | Kluetz |
| 2006/0188621 A1 | 8/2006 | Jones |
| 2006/0204624 A1 | 9/2006 | Patist |
| 2006/0210673 A1 | 9/2006 | Petrofsky |
| 2006/0210687 A1 | 9/2006 | Lundberg |
| 2006/0216397 A1 | 9/2006 | Kerkman |
| 2006/0240077 A1 | 10/2006 | Hansen |
| 2006/0251789 A1 | 11/2006 | Lundberg |
| 2006/0263416 A1 | 11/2006 | Brent |
| 2006/0263487 A1 | 11/2006 | Brent |
| 2006/0286260 A1 | 12/2006 | Nayak |
| 2007/0031572 A1 | 2/2007 | Larsen |
| 2007/0082026 A1 | 4/2007 | Aimutis |
| 2007/0082027 A1 | 4/2007 | Aimutis |
| 2007/0082028 A1 | 4/2007 | Aimutis |
| 2007/0082029 A1 | 4/2007 | Aimutis |
| 2007/0082085 A1 | 4/2007 | Catani |
| 2007/0087084 A1 | 4/2007 | Coleman |
| 2007/0110684 A1 | 5/2007 | Jensen |
| 2007/0110875 A1 | 5/2007 | Keithly |
| 2007/0116837 A1 | 5/2007 | Prakash |
| 2007/0202211 A1 | 8/2007 | Altom |
| 2007/0298078 A1 | 12/2007 | Harrison |
| 2008/0014303 A1 | 1/2008 | Jacops |
| 2008/0020094 A1 | 1/2008 | Lager |
| 2008/0032015 A1 | 2/2008 | Walpole |
| 2008/0113079 A1 | 5/2008 | Takamine |
| 2008/0166464 A1 | 7/2008 | Lundberg |
| 2008/0193590 A1 | 8/2008 | Lundberg |
| 2008/0233238 A1 | 9/2008 | Roney |
| 2008/0248185 A1 | 10/2008 | Ferrari |
| 2008/0305096 A1 | 12/2008 | Verdegem |
| 2008/0311174 A1 | 12/2008 | Sakamoto |
| 2008/0311265 A1 | 12/2008 | MacDonald |
| 2008/0311272 A1 | 12/2008 | Wild |
| 2009/0011111 A1 | 1/2009 | Sugiura |
| 2009/0022877 A1 | 1/2009 | Sample |
| 2009/0035441 A1 | 2/2009 | Hirashima |
| 2009/0110798 A1 | 4/2009 | Gusek |
| 2009/0123597 A1 | 5/2009 | Williams |
| 2009/0130291 A1 | 5/2009 | Driggers |
| 2009/0169680 A1 | 7/2009 | Rabault |
| 2009/0186383 A1 | 7/2009 | Mancosky |
| 2009/0215704 A1 | 8/2009 | Johnson |
| 2009/0220665 A1 | 9/2009 | Vanhemelrijck |
| 2009/0258111 A1 | 10/2009 | Takayanagi |
| 2009/0269376 A1 | 10/2009 | Lundberg |
| 2009/0274811 A1 | 11/2009 | Lundberg |
| 2009/0297671 A1 | 12/2009 | Basker |
| 2009/0297682 A1 | 12/2009 | Dukan |
| 2010/0015302 A1 | 1/2010 | Bates |
| 2010/0040728 A1 | 2/2010 | Henderson |
| 2010/0086511 A1 | 4/2010 | Sakamoto |
| 2010/0092620 A1 | 4/2010 | Bravo |
| 2010/0099648 A1 | 4/2010 | Debon |
| 2010/0166913 A1 | 7/2010 | Stewart |
| 2010/0233342 A1 | 9/2010 | Almeida |
| 2010/0234569 A1 | 9/2010 | Helling |
| 2010/0248320 A1 | 9/2010 | Lyons |
| 2010/0297295 A1* | 11/2010 | Brooks ................. A21D 2/165 426/61 |
| 2011/0020525 A1 | 1/2011 | Homsma |
| 2011/0081336 A1 | 4/2011 | Medoff |
| 2011/0086133 A1 | 4/2011 | Puranen |
| 2011/0129591 A1 | 6/2011 | Jordan |
| 2011/0151056 A1 | 6/2011 | Chukwu |
| 2011/0223294 A1 | 9/2011 | Itoh |
| 2011/0250314 A1 | 10/2011 | Lager |
| 2011/0268860 A1 | 11/2011 | Lundberg |
| 2011/0278153 A1 | 11/2011 | Bates |
| 2011/0287151 A1 | 11/2011 | Simunovic |
| 2011/0293814 A1 | 12/2011 | Alexandre |
| 2011/0305808 A1 | 12/2011 | Sample |
| 2011/0308141 A1 | 12/2011 | Christensen |
| 2011/0311599 A1 | 12/2011 | Boursier |
| 2011/0311708 A1 | 12/2011 | Wang |
| 2012/0016026 A1 | 1/2012 | Bromley |
| 2012/0037013 A1 | 2/2012 | Bertocchi |
| 2012/0040068 A1 | 2/2012 | Eveland |
| 2012/0040073 A1 | 2/2012 | Fox |
| 2012/0088015 A1 | 4/2012 | Han et al. |
| 2012/0135109 A1* | 5/2012 | Paeschke ................. A23L 2/02 426/50 |
| 2013/0064947 A1 | 3/2013 | Nafisi-Movaghar |
| 2013/0123374 A1 | 5/2013 | Gusek |
| 2014/0308389 A1* | 10/2014 | Ames ..................... A23L 33/40 426/2 |

FOREIGN PATENT DOCUMENTS

| | | |
|---|---|---|
| EP | 0061305 | 9/1982 |
| EP | 0485030 | 5/1992 |
| FR | 2712464 | 5/1995 |
| GB | 635053 | 4/1950 |
| GB | 1045243 A | 10/1966 |
| GB | 1341963 | 12/1973 |
| JP | 58098055 | 6/1983 |
| JP | 3146593 | 6/1991 |
| JP | 06335371 | 6/1994 |
| JP | 2001128637 | 5/2001 |
| JP | 2004261039 | 9/2004 |
| RU | 2202257 | 4/2003 |
| RU | 2342854 | 1/2009 |
| WO | 199427451 | 12/1994 |
| WO | 199903892 | 1/1999 |
| WO | 200005310 | 2/2000 |
| WO | 2000013532 | 3/2000 |
| WO | 2001032978 | 5/2001 |
| WO | 2001078859 | 10/2001 |
| WO | 200184965 | 11/2001 |
| WO | 2004008881 | 1/2004 |
| WO | 2004044285 | 5/2004 |
| WO | 2004085484 A1 | 10/2004 |
| WO | 2005087200 A1 | 9/2005 |
| WO | 2006096884 A2 | 9/2006 |
| WO | 2007092087 | 8/2007 |
| WO | 2007092448 | 8/2007 |
| WO | 2007139563 | 12/2007 |
| WO | 2008068572 A2 | 6/2008 |
| WO | 2008077594 | 7/2008 |
| WO | 2008089821 | 7/2008 |
| WO | 2008095254 | 8/2008 |
| WO | 2008104779 | 9/2008 |
| WO | 2008112957 | 9/2008 |
| WO | 2008134626 | 11/2008 |
| WO | 2009013395 | 1/2009 |
| WO | 2010010219 | 1/2010 |
| WO | 2010084240 | 7/2010 |
| WO | 2010093864 | 8/2010 |
| WO | 2011024183 | 3/2011 |
| WO | 2011063386 | 5/2011 |
| WO | 2012016201 A2 | 2/2012 |
| WO | 2012045045 A1 | 4/2012 |
| WO | 2012047786 A1 | 4/2012 |
| WO | 2015146880 | 1/2015 |

OTHER PUBLICATIONS

Paquin: Functional and Speciality Beverage Technology; Elsevier, Jan. 29, 2009—Technology & Engineering—512 pages.*

International Search Report—PCT/US2014/015326—dated May 9, 2014.

Bagherian et al., "Comparisons Between Conventional Microwave— and Ultrasound-Assisted Methods for Extraction of Pectin From Grapefruit," Chemical Engineering and Processing, vol. 50, 2011, pp. 1237-1243.

Bourquin, L.D., et al., Vegetable fiber fermentation by human fecal bacteria: Cell wall polysaccharide disappearance and short-chain

(56) References Cited

OTHER PUBLICATIONS fatty acid production during in vitro fermentation and water-holding capacity of unfermented residues. Journal of Nutr. 123: 860-869. (Abstract), 1993.

Corey et al. "Witloof Chicory: A New Vegetable Crop in the United States" 1990 Advances in New Crops Timber Press pp. 414-418 Accessed from http://www.hort.purdue.edu/newcrop/proceedings1990/v1-414.html pp. 1-8.

Dongowski, G., et al., The degree of methylation influences the degradation of pectin in the intestinal tract of rats and in vitro. J. Nutr. 132: 1935-1944. (Abstract), 2002.

Endress, Hans Ulrich, et al, In Fiber ingredients: Food applications and health benefits. Susan Sung Cho and Priscilla Samuels, eds. CRC Press Francis Taylor Group, Boca Raton FL. (Summary), 2009.

Fishman, M.L., et al., Component and global average radii of gyration of pectins from various sources. Carbohydrate Polymers 15: 89-104, 1991.

Gibson, G.R., et al., Dietary modulation of the colonic microbiota: Introducing the concept of prebiotics. J. Nutr. 125: 1401-1412, 1995.

Gibson, G.R., et al., "Handbook of Prebiotics" CRC Press Taylor & Francis Group. Boca Raton, FL. (Table of Contents), 2008.

Grootaert, C., et al., Microbial metabolism and prebiotic potentcy of arabinoxylan oligosaccharides in the human intestine. Trends in Food Science & Technology. 18(2): 64-71. (Abstract), 2007.

Gulfi, M., et al, Influence of structure on in vitro fermentability of commerical pectins and partially hydrolysed pectin preparations. Carbohydrate Polymers 59: 247-255, 2005.

Gulfi, M., et al., The Chemical characteristics of apple pectin influence its fermentability in vitro. LWT 39: 1001-1004, 2006.

Gulfi, M., et al., In vitro fermentability of a pectin fraction rich in hairy regions. Carbohydrate Polymers, 67: 410-416, 2007.

Hellin et al., "Changes in High and Low Molecular Weight Carbohydrates During Rhizopus Nigricans Cultivation on Lemon Peel," Carbohydrate Polymers, vol. 45, 2001, pp. 169-174.

Hotchkiss, A.,et al., New bioactive and biobased product applications of pectin. In Pectins and Pectinases, Schols et al. editors. Wageningen Academic Publisher, Wageningen, The Netherlands (Summary and Abstract), 2009.

International Search Report and Written Opinion in PCT/US10/57778, dated Mar. 2, 2011.

International Search Report and Written Opinion in PCT/US11/54556 dated Feb. 6, 2012.

International Search Report and Written Opinion in PCT/US11/62303 dated Apr. 5, 2012.

International Search Report and Written Opinion in PCT/US15/14850 dated Jun. 25, 2015.

"Isolate" Merriam-Webster.com. Merriam-Webster, n.d. Web., Mar. 27, 2014. http://www.merriam-webster.com/dictionary/isolate 2 pages.

Khan, M.K. et al, Ultrasound-assisted extraction of polyphenols (flavanone glycosides from orange (*Citrus sinensis* L.) peel. Food Chemistry, 119, 851-858. (Abstract).

Manderson, K., et al, In vitro determination of prebiotic properties of oligosaccharides derived from an orange juice manufactoring by-product stream. Applied and environmental microbology. 71(12):8383-8389, 2005.

Nicolini L., Changes in in-vitro digestibillity of orange peels and distillery grape stalks after solid-state fermentation by higher fungi. Bioresource Technology 45(1): 17-20 (Abstract), 1993.

Olano-Martin, E., et al, Comparison of the in vitro bifidogenic properties of pectins and pectic-oligosaccharides. J Appl Microbiol 93: 505-511, 2002.

Roth, J.A., et al, Pectin improves colonic function in rat short bowel syndrome. Journal of surgical research 58: 240-246. (Abstract), 1995.

Salyers, A. A., et al, Fermentation of mucins and plant polysaccharides by anaerobic bacteria from the human colon. Applied and Environmental Microbiology. 1977: 529-533 (Abstract).

Sunvold, G.D., et al., In vitro fermentation of cellulose, beet pulp, citrus pulp, and citrus pectin using fecal inoculum from cats, dogs, horses, humans, and pigs and ruminal fluid from cattle. J Anim Sci 1995. 73:3639-3648, 1995.

Titgemeyer, E.C., et al, Fermentability of various fiber sources by human fecal bacteria in vitro. Am J of Clinical Nutr 53:1418-1424. (Abstract), 1991.

Tripodo, M.M., et al, Citrus waste recovery: a new environmentally friendly procedure to obtain animal feed. Bioresource Technology 91(2): 111-115. (Abstract), 2004.

"Understanding Mesh Sizes and Microns", www.skylighter.com/fireworks/making-fireworks-projects/screen-mess-metal-particl. . . May 31, 2013. , page 1.

Van Den Broek, L.A.M., Voragen, A.G.J., 2008. Bifidobacterium glycoside hydrolases and (potential) probiotics. 2008. Innovative Food Science & Emerging Technologies 9: 401-407. (Abstract and Industrial Relevance).

Veldius, M.K., et al., Oil- and water-soluble aromatics distilled from citrus fruit and processing waste J. of Food Science 37: 108-112. (p. 108), 1972.

Will, et al., "Processing and Analytical Characterisation of Pulp-Enriched Cloudy Apple Juices," Elsevier, LWT—Food Science and Technology, vol. 41, No. 10, 2008, pp. 2057-2063.

Yamada, H., et al, Recent studies on structures and intestinal immunity modulating activities of pectins and pectic polysaccharides from medicinal herbs. In Pectins and Pectinases, Schols et al. editors. Wageningnen Academic Publisher, Wageningen, The Netherlands. (Abstract), 2009.

Panquin: "Funcitional and Speciality Beverage Technology"; Elsevier, Jan. 29, 2009, Technology & Engineering—512 pages.

\* cited by examiner

PREPARATION AND INCORPORATION OF CO-PRODUCTS INTO BEVERAGES TO ENHANCE NUTRITION AND SENSORY ATTRIBUTES

This application claims priority to U.S. Provisional Patent Application No. 61/765,274 filed on Feb. 15, 2013, the disclosure of which is expressly incorporated herein by reference.

FIELD OF THE INVENTION

The invention relates to processing and use of co-products obtained from juice extraction of fruits and vegetables. More particularly, the invention relates to the use of the co-products obtained from fruit and vegetable juice extraction by-products in beverage and food products to impart nutrition and sensory characteristics to the beverage and food products.

BACKGROUND OF THE INVENTION

Fruit and vegetable juices are convenient and popular beverages for consumers. A disadvantage to consuming juices is that often the juice extraction process excludes portions of the whole fruit or vegetable that would otherwise be consumed if the fruit or vegetable were to be eaten in its whole form. For example, a consumer who peels and eats an orange will consume an amount of edible material (e.g., including cellulosic material, membranes, albedo, pulp, etc.), which would not necessarily be present if the consumer instead drank juice extracted from the orange. Accordingly, many fruit and vegetable juices lack some of the nutrients contained in the totality of the edible portions of the whole fruit or vegetable. Such nutrients include for example fiber, phytonutrients, and vitamins.

Attempts have been made to supplement fruit and vegetable juices with added nutrition, such as fiber. For example, various fiber powders obtained from edible and/or typically inedible portions of foods are commercially available; however either such powders tend to impart an undesired flavor to the juice, or they dissolve so thoroughly a consumer has difficulty believing that the juice does in fact contain the added fiber. Efforts to incorporate large pieces of insoluble fibers into juice have generally resulted in the inclusion of undesired color, flavor, and fibrous textures to the juice. In some cases, the conversion to a powder also degrades the nutrition of such by-product due to the applied heat needed for dehydration.

BRIEF SUMMARY OF THE INVENTION

In one aspect, the invention relates to a beverage comprising juice and a co-product from juice extraction. The co-product comprises a number average particle size of between 0.1 and 2,000 microns, a total polyphenol content of at least 2500 parts per million, a moisture content of between 70% and 85% by weight, and a combined peel and seed content between 0.01% and 20% by weight.

In another aspect, the invention relates to a method for making a beverage by preparing a co-product by obtaining a by-product from juice extraction, removing inedible material from the by-product, reducing the particle size of the by-product by microgrinding, homogenizing, and combinations thereof, and pasteurizing the co-product, and adding the co-product to juice. The co-product comprises a number average particle size of between 0.1 and 2000 microns, a total polyphenol content of at least 2500 ppm, a moisture content of between 70% and 85% by weight, and a combined peel and seed content between 0.01% and 20% by weight.

In another aspect, the invention relates to a beverage comprising about 5% to about 90% by weight juice, added water, at least one non-nutritive sweetener, at least one flavor, and a co-product from juice extraction.

In another aspect, the invention relates to a beverage comprising water, at least one sweetener, at least one acidulant, at least one flavor, at least one colorant, and a co-product from juice extraction.

It is an advantage of the invention to provide beverages and other beverage products having desirable appearance, taste and health properties. It is an advantage of at least certain embodiments of the invention to provide juice beverages having improved formulations, including improved nutrition and sensory characteristics. It is another advantage of the invention to provide economical juice beverages. It is a further advantage of the invention to combine components derived from one or more distinct fruits and vegetables to provide products having unique taste profiles and appearances. These and other advantages and features of the invention or of certain embodiments of the invention will be apparent to those skilled in the art from the following disclosure and description of exemplary embodiments.

DETAILED DESCRIPTION OF THE INVENTION

Figure 1:
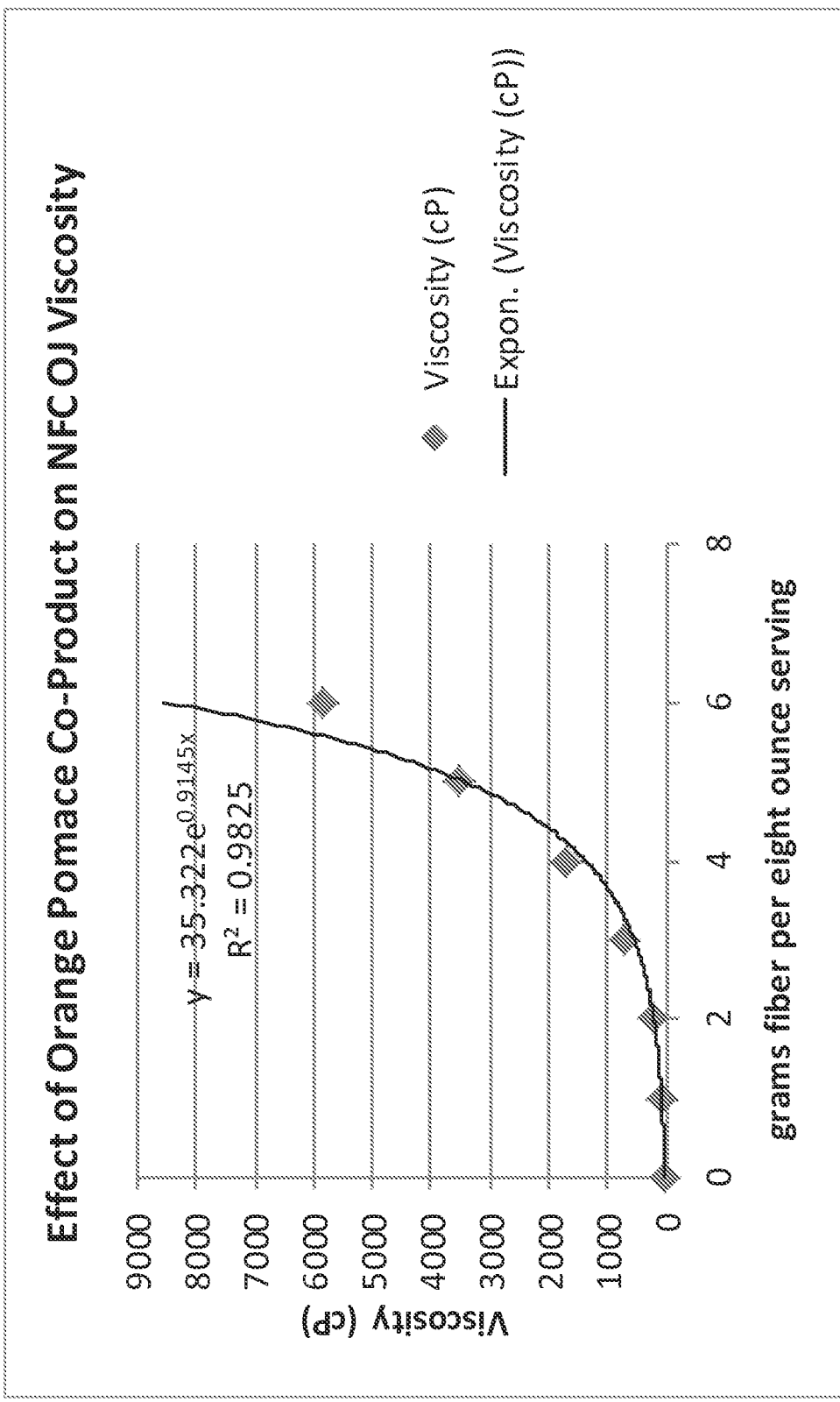
FIG. 1 provides a graph of measured viscosity versus grams of fiber per eight ounce serving, for juice beverages comprising added co-product.

Juice beverages are popular with consumers for numerous reasons, such as their taste, portability, nutrition, and convenience, as compared to the amount of preparation often involved when consuming whole fruits or vegetables as well as their general perishability. As noted above, a drawback to consuming fruit and/or vegetable juices is that often the juice extraction process excludes edible portions of the fruit or vegetable that would otherwise be consumed if the fruit or vegetable were to be eaten in its whole form. It would be beneficial to process the edible portions of fruits and vegetables obtained from juice extraction to provide a useful food ingredient, or "co-product," to enhance the nutrition and other attributes of fruit and vegetable juice. Moreover, employing such co-products minimizes waste from the juice extraction process.

According to embodiments of the present invention, nutrients from edible portions of fruits and vegetables that are typically excluded from the final juice products, are recombined with the juice products in the form of one or more co-products. In certain embodiments, the type and amount of co-product is selected to produce a final beverage comprising juice and co-product that comprises at least the same nutrition as the whole fruit(s) or vegetable(s) from which the juice was obtained.

As used herein, the term "co-product" refers to edible by-products from the extraction of juice from fruit(s) and/or vegetable(s), which have been subjected to comminution and pasteurization. By "edible by-products of juice extraction" it is meant any and all portions of the fruit(s) and/or vegetable(s) that are typically eaten. The specific portions that qualify as "edible" by-products of juice extraction will vary depending on the particular fruit or vegetable; for instance, the skin is typically eaten when a pear is consumed, yet the seeds and stem are discarded. Many berries are eaten whole, including skin and seeds, whereas the skin of a banana is typically not consumed. A skilled practitioner will be familiar with the portions of specific fruits and vegetables that are considered edible. Likewise, the comminution process conditions and pasteurization conditions are selected for the particular edible by-products of juice extraction to form the co-products, depending on the individual physical and chemical characteristics of the edible by-products. The resulting processed co-product from the edible portions of fruits and vegetables obtained from juice extraction provide a useful food ingredient, which may be employed to enhance the nutrition and other attributes of fruit and vegetable juice. Advantageously, employing such co-products minimizes waste from the juice extraction process, and allows the use of inexpensive nutrient-rich edible material.

According to certain embodiments, the co-product comprises pomace, for instance citrus pomace, sometimes referred as citrus rag. As used herein, the term "pomace" refers to the by-product remaining after fruit or vegetable juice pressing processes, wine crush operations, puree and concentrate operations, canning processes, and other food manufacturing processes. Pomace may include, for example, skins, pulp, seeds, and edible part of stems of the fruit and vegetable such as apples or carrots. In some cases the pomace can derive from or contain other parts of the fruit and vegetable such as pod, stalk, flower, root, leaves and tuber. In a juice extraction process, the pomace is typically in the form of a part of press cake. Depending on the specific fruit or vegetable, pomace may contain portions of the fruit or vegetable which are inedible. Consequently, any inedible portions are removed from the pomace before it is processed into a co-product.

In embodiments in which citrus pomace is employed as a co-product, any seeds or pieces of peel are removed prior to comminution. As used herein, "peel" of any citrus fruit refers to the flavedo, or colored outer skin of the peel. Some amount of albedo, in contrast, may be included in the co-product as it is typically considered edible.

By-products from paste and puree processes such as tomato skins and seeds from tomato ketchup and paste processing are also included in the pomace even though they are not the by-products from juice extracts. Fruit skins from cannery processes are also edible by-products. Hereafter, pomace includes all by-products from fruit and vegetable juice, paste, puree and canning processes.

Side-stream ingredients, for instance pomace, generally contain high total dietary fiber content (e.g., 50 or more percent by weight), low amounts of sugars (e.g., typically less than 5% but more commonly less than 2% by weight in wet pomace), and varying amounts of essential vitamins, minerals and phytonutrients (depending on types of fruit/vegetable and process applied). For example, cranberry pomace remains after the squeezing of juice for cranberry type cocktails and juices and concentrates. These cranberry pomace materials have been found to contain 70% to 75% fiber with an insoluble to soluble fiber ratio of 9 or 10 to 1 (wet basis), less than 5%-10% protein, and less that 5% sugars and starches. Typically, by-products are removed from the juicing process due to challenges with texture and flavor when creating a juice beverage. Likewise, whole fruits and vegetables also contain fiber and nutrient content much higher than the extracted juice products and thus are much healthier.

Pomace has been used for fertilizer and substrates for microorganism growth, for example, and dried pomace has had limited use in food products such as soups and snacks, and also has been used in the dietary supplement industry. However, pomace is generally not used in food products due to its gritty texture, sedimentation, fibrous nature, high insoluble fiber content, intense flavor and lack of starch and protein. Thus pomace is generally considered a waste by-product in the fruit and vegetable industry.

As noted above, various commercially available fiber powders, typically sourced from grains, seeds or root components, are used as food and beverage additives; however, such powders tend to suffer from at least one drawback. In particular, when the fiber powder is tasteless and does not change the appearance or mouthfeel (e.g., texture, thickness, body, etc.) of the juice, a consumer may not understand or believe that the juice does in fact contain added fiber. On the other hand, certain fiber powders tend to exhibit an undesired flavor and/or gummy texture, to the juice due to the processing of the fiber source, which negatively affects the organoleptic properties of the final juice beverage. Incorporating large pieces of insoluble fibers into juice has generally resulted in the inclusion of undesired flavor, color, and fibrous textures to the juice, as discussed above with respect to pomace.

Surprisingly, it has been discovered that processing edible by-products of juice extraction to form co-products, provides a source of nutrients to be added to liquids to simultaneously enhance the nutritional and sensory attributes of the final beverage product. The processing importantly includes removing inedible by-products of juice extraction, followed by comminution and pasteurization. For example, citrus pomace juice extraction by-products typically contain seeds and often pieces of peel, which are not considered edible. The processing of juice extraction by-products thus results in a co-product containing a maximum amount of the seeds and peel prior to comminution, such as no more than 10% by weight of seeds, or no more than 5% by weight of seeds, or no more than 2% by weight of seeds, and no more than 5% by weight of peel, or no more than 1% by weight of peel. When the co-products are obtained from citrus pomace, the maximum amount of combined peel and seeds is 20%, or the combined peel and seeds makes up between about 0.01% and about 20% by weight of the total co-products, or between about 0.01% and about 10% by weight of the total co-products, or between about 0.01% and about 5% by weight of the total co-products, or between about 0.01% and about 2% by weight of the total co-products.

According to certain embodiments, the processing of juice extraction by-products of a fruit or vegetable comprises removing the inedible portions such that the co-products obtained from the remaining juice extraction by-products comprise no more than 20% by weight inedible material, or the inedible material makes up between about 0.01% and about 20% by weight of the total co-products, or between about 0.01% and about 10% by weight of the total co-products, or between about 0.01% and about 5% by weight of the total co-products, or between about 0.01% and about 2% by weight of the total co-products.

According to certain embodiments, the juice extraction by-products of a fruit or vegetable comprise peel and/or seeds that are considered edible. In such embodiments, the processing of juice extraction by-products of a fruit or vegetable comprises removing the inedible portions such that the co-products obtained from the remaining juice extraction by-products comprise no more than 80% by weight combined peel and seeds, or the combined peel and seeds makes up between about 0.01% and about 80% by weight of the total co-products, or between about 0.01% and about 60% by weight of the total co-products, or between about 0.01% and about 40% by weight of the total co-products, or between about 0.01% and about 20% by weight of the total co-products, or between about 0.01% and about 10% by weight of the total co-products, or between about 0.01% and about 5% by weight of the total co-products, or between about 0.01% and about 2% by weight of the total co-products.

The removal of inedible material from by-products of juice extraction concomitantly decreases the nutritional value of the final co-products, because many inedible materials contain significant amounts of fiber, phytonutritents, and vitamins. Moreover, separating inedible material from edible material in juice extraction by-products is not necessarily a simple task. Current known mechanical methods for deseeding citrus pomace, for instance, usually have a very low yield of about 30-40% of the total edible material recovered due to entanglement of seeds and fibrous material resulting in much of the edible material being difficult to separate and thus discarded with the seeds. Such methods comprise employing standard juice processing finisher screens, screw finishers, and paddle finishers. Extractors are utilized to remove the peel in fruit processing. Other inedible materials may be separated by taking advantage of differences in density, such as by employing washing and gravity methods known to the skilled practitioner.

Figure 2B:
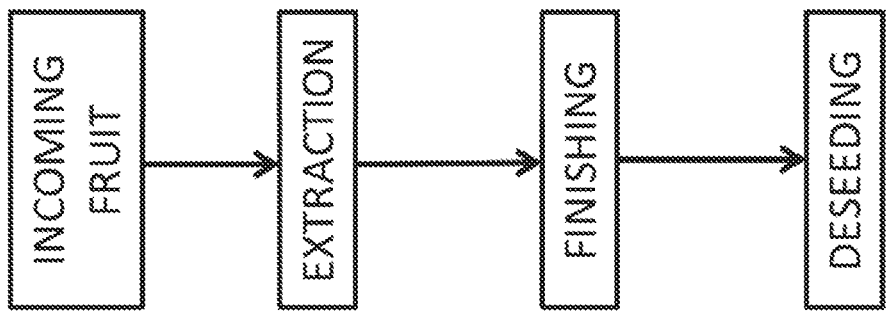
FIG. 2B provides a flow chart depicting a medium to low yield process in accordance with at least one aspect of the present invention.
Figure 2A:
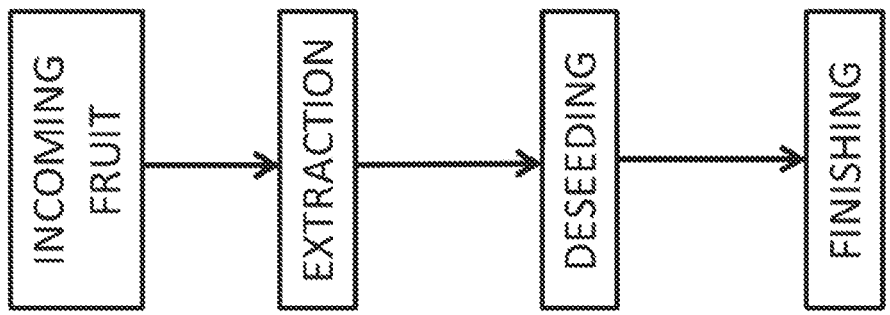
FIG. 2A provides a flow chart depicting a high yield process in accordance with at least one aspect of the present invention.

FIGS. 2A and 2B depict generally how the unit operations may flow in accordance with certain embodiments described herein. FIG. 2A depicts a high yield process wherein the incoming fruit is subjected to extraction, deseeding, and finishing. FIG. 2B depicts a medium to low yield process wherein the incoming fruit is subjected to extraction, finishing, and then deseeding.

Beverages and beverage products according to the present invention comprise at least a liquid component and a co-product component. The liquid component typically comprises water or any liquid that may be obtained from a particular fruit or vegetable. The liquid may be, for example and without limitation, water, carbonated water, a juice, a serum, a juice concentrate, a clarified juice, a single strength juice, a not from concentrate juice, a fruit or vegetable water, a puree, a nectar and combinations thereof. In certain embodiments, the liquid does not exhibit a significant flavor. In alternate embodiments, the liquid provides the identifiable flavor of the juice beverage. In certain embodiments, the liquid provides one of a plurality of identifiable flavors in the juice beverage.

As used herein, the term "identifiable" with respect to one or more fruits and/or vegetables is defined as the taste, or the scent, or the feel, or the appearance, or combinations thereof, of the juice beverage being determined to be recognizable as at least one fruit and/or vegetable by a trained sensory panel. Sensory panels are well known to those of skill in the art, and comprise testers trained to evaluate the organoleptic attributes of comestibles. Typically, sensory panelists have been screened for their taste acuity and extensively trained in the use of standardized vocabulary to describe the appearance, aroma, flavor, mouthfeel and aftertaste of a wide variety of products, as well as scaling techniques to quantify the attributes. The numerical data generated by the sensory panel testers are then analyzed for their statistical significance.

Co-products obtained from fruits and vegetables advantageously provide macro nutrition, micro nutrition, or combinations thereof, to compositions according to embodiments of the invention. As used herein, the term "macro nutrition" refers to components that provide nutrients in a relatively large amount, for example and without limitation, fiber, protein, carbohydrates, fat, and combinations thereof. As used herein, the term "micro nutrition" refers to components that provide nutrition in relatively small amounts, for example and without limitation, vitamins, electrolytes, minerals, trace minerals, phytonutrients such as flavonoids, limonoids, carotenoids, and combinations thereof. For example and without limitation, the solids may provide fiber, vitamins such as vitamin C and vitamin A, flavonoids, carotenoids such as lycopene, and combinations thereof. Phytonutrients are also referred as phytochemicals, and the terms are used interchangeably herein. Accordingly, the macro nutrition, the micro nutrition, or both, of a composition in embodiments of the invention may be manipulated by selecting co-products derived from a specific fruit, vegetable, or combinations thereof, and incorporating the co-products into the composition in a predetermined quantity. For instance, when it is desired to provide a composition comprising fiber and flavonoids, citrus co-products may be included in the composition. When a particular level of fiber is desired for a composition, the amount of co-product added may be selected to provide that quantity of fiber, depending on the fiber content of the type of co-product being added.

According to at least certain embodiments a beverage is provided comprising juice and a co-product from juice extraction, wherein the co-product comprises a number average particle size of between 0.1 and 2000 microns, a total polyphenol content of at least 2500 parts per million, a moisture content of between 70% and 85% by weight, and a maximum seed content of 5% by weight. In an aspect, the juice comprises orange juice and the co-product comprises citrus pomace co-product. The beverage optionally contains only ingredients that are obtained from fruits or vegetables, and can thus be labeled as "100% fruit," or "100% vegetable," or "100% juice," "100% fruit puree", "100% fruit or vegetable fiber" depending on the local laws and regulations. For instance, in an embodiment, the beverage consists essentially of not from concentrate orange juice, citrus pomace co-product, and at least one added flavor.

In an embodiment the beverage comprises at least 2.5 grams of dietary fiber per 8 ounce serving, which is equal to a "good source of fiber: as defined by the United States Food and Drug Administration ("FDA") (see the Code of Federal Regulations Title 21). Similarly, in an embodiment the beverage comprises at least 5 grams of fiber per 8 ounce serving, which is equal to an "excellent source of fiber" as defined by the FDA. For example, the co-product optionally comprises between about 6% and about 15% by weight total fiber. In certain embodiments, the fiber of the co-product comprises both insoluble fiber and soluble fiber, wherein the fiber comprises a ratio of soluble fiber to insoluble fiber of about 1:2. Other amounts of total fiber and ratios of soluble to insoluble fiber are also suitable.

The particle size of the co-product is achieved by comminution of the juice extraction by-product. In certain embodiments, the co-product comprises a number average particle size of between 0.1 micron and 2000 microns, or between 1 micron and 700 microns, or between 1 micron and 500 microns, or between 1 micron and 250 microns, or between 1 micron and 125 microns, or between 38 and 125 microns, or between 25 microns and 250 microns.

When the co-product is obtained from orange juice extraction by-products, the co-product comprises one or more orange cultivars, for example and without limitation, Hamlin orange pomace co-product, Valencia orange pomace co-product, Pera orange pomace co-product, Navel orange pomace co-products, Parson Brown orange pomace co-product, Cara orange pomace co-product, Pineapple orange pomace co-product or combinations of any of them. As discussed above, an advantage of at least certain aspects of the co-product provided herein is the addition of nutrients to beverage products. In embodiments where the co-product comprises orange pomace co-product, the co-product provides phytonutrients comprising one or more polyphenols and limonoids, for example and without limitation hesperidin, limonin, narirutin, nobiletin, didymin, sinensetin, tangeretin, nomilin, and combinations of any of them. When the co-product comprises orange pomace co-product, the co-product optionally comprises at least 20 milligrams (mg) of vitamin C per 100 grams of co-product, such as at least 30 mg vitamin C per 100 g of co-product, or at least 40 mg vitamin C per 100 g of co-product, or at least 50 mg vitamin C per 100 g of co-product. Moreover, when the co-product comprises orange pomace co-product, approximately 10 percent by weight of "wet basis", or "as is" co-product—as opposed to dehydrated powder—a beverage comprising co-product would need to be orange pomace co-product to make a beverage that is a "good source of fiber." Likewise, approximately 20 percent by weight of a beverage comprising co-product would need to be orange pomace co-product to make a beverage that is an "excellent source of fiber."

As discussed above, certain commercially available fiber additives dissolve or disperse into beverages without affecting the viscosity of the final beverage product. In contrast, embodiments of the present invention comprise a beverage including a liquid and co-product, wherein the beverage comprises a (Newtonian) viscosity between about 1 centipoises and about 100,000 centipoises (cP), or between about 80 cP and about 6000 cP, or between about 90 cP and about 5000 cP, or between about 100 cP and about 4000 cP, or between about 120 cP and about 3500 cP, or between about 300 cP and about 3000 cP, or between about 500 cP and about 2000 cP, or between about 700 cP and about 1750 cP. The viscosity may be measured using the ASTM WK31279 test method, for example, and employing a Brookfield rotary viscometer at a temperature of 25 degrees Celsius.

In certain embodiments, particularly embodiments comprising a large amount of co-product, the beverage will be most accurately described as a non-Newtonian Power Law Fluid, comprising a flow consistency index (K) range of between 1 cP and 100.00 cP (i.e., between 0.001 and 100 Pascal seconds) and a flow behavior index (n) range of between 0.10 to 0.80. Non-Newtonian Power Law fluids (i.e., the Ostwald-de Waele relationship) can be described mathematically by the following equation: $\tau = K(\partial u/\partial y)^n$, where $\tau$=shear stress; K=consistency; $\partial u/\partial y$=shear rate (in seconds$^{-1}$); and n=power law exponent.

Similarly, in certain embodiments, particularly embodiments comprising a large amount of co-product, the beverage will be most accurately described as a non-Newtonian Herschel-Bulkley Fluid, comprising a yield stress ($\tau_0$) of between 1 and 1000 Pascals, a flow consistency index (K) range of between 1 cP and 100.00 cP (i.e., between 0.001 and 100 Pascal seconds) and a flow behavior index (n) range of between 0.10 to 0.80. Herschel-Bulkley fluids can be described mathematically by the following equation: $\tau = \tau_0 + K(\gamma)^n$, where $\tau$=shear stress; $\tau_0$=yield stress; K=consistency; $\gamma$=shear rate; and n=power law exponent.

In certain embodiments, methods are provided for making a beverage comprising a co-product. The methods include preparing a co-product comprising obtaining a by-product from juice extraction, removing inedible material from the by-product, reducing the particle size of the by-product by microgrinding, homogenizing, or combinations thereof, and pasteurizing the co-product. The co-product is added to juice, where the co-product comprises a number average particle size of between 0.1 and 2000 microns, a total polyphenol content of at least 2500 parts per million, a moisture content of between 70% and 85% by weight, and a maximum seed content of 5% by weight. The removal of inedible material from the by-product of juice extraction optionally comprises removal of seeds, peel, stems, and combinations thereof. For instance, seeds are mechanically removed from the by-product.

In an aspect, the juice of the method is orange juice and the co-product is citrus pomace co-product. Optionally the juice comprises 100% juice, and contains only ingredients obtained from fruits, vegetables, and combinations thereof.

According to an embodiment, a "nectar" beverage is provided comprising about 5% to about 90% by weight juice (such as about 30% to about 70% by weight juice), added water, at least one non-nutritive sweetener, at least one flavor, and a co-product from juice extraction, wherein the co-product comprises a number average particle size of between 0.1 and 2000 microns, a total polyphenol content of at least 2500 parts per million, a moisture content of between 70% and 85% by weight, and a maximum seed content of 5% by weight. The beverage comprises a brix of between about 5 brix and about 9 brix. As used herein, the term "nectar" refers to a beverage comprising juice and added water, which has a lower brix than the brix of the juice included in the beverage. The percent by weight juice is as calculated on a single strength juice basis. Optionally, the juice comprises from concentrate juice added in an amount to provide between 5% and 90% by weight single strength juice. The standard of identity brix values of specific juices are established by the FDA.

In certain embodiments, the nectar beverage product comprises juice (e.g., citrus juice, orange juice, etc.) in an amount from about 5% to about 90% by weight of the beverage product, such as about 10% to about 75% by weight, or about 15% to about 50% by weight, or about 20% to about 60% by weight, 40-80% water or about 20% to about 40% by weight, or about 20% to about 30% by weight.

In certain embodiments, water is added to the nectar beverage at a level of from about 0% to about 90% by weight of the beverage product, e.g., about 15% to about 80% by weight, about 40% to about 80% by weight, or about 40% to about 60% by weight.

In certain embodiments, the nectar beverage comprises between about 2% and about 30% by weight co-product, or between about 5% and about 25% by weight co-product, or between about 5% and about 20% by weight co-product, or between about 7% and about 20% by weight co-product, or between about 5% and about 15% by weight co-product, or between about 10% and about 20% by weight co-product.

In an aspect of the nectar beverage, the co-product comprises citrus pomace co-product. In such aspects, the juice optionally comprises orange juice. The nectar beverage may comprise at least 2.5 grams of fiber per 8 ounce serving, or at least 5 grams of fiber per 8 ounce serving. In prior known nectar beverages, homogenized pulp has been employed for taste and mouthfeel purposes; however, co-products of the present invention may be used to replace some or all of such homogenized pulp. An advantage to incorporating co-product instead of homogenized pulp is that the juice extraction by-products are less expensive than fruit pulp.

In certain embodiments, nectar beverages comprise a viscosity between about 1 cP and about 100,000 cP, or between about 10 cP and about 1500 cP, or between about 10 cP and about 1000 cP, or between about 10 cP and about 500 cP, or between about 20 cP and about 750 cP, or between about 30 cP and about 500 cP, or between about 50 cP and about 300 cP, or between about 75 cP and about 200 cP. The viscosity may be measured using the ASTM WK31279 test method, for example, and employing a Brookfield rotary viscometer at a temperature of 25 degrees Celsius.

According to an embodiment, a "juice drink" beverage is provided comprising water, between 0% and 30% by weight juice (such as about 5% to about 30% by weight juice), at least one sweetener, at least one acidulant, at least one flavor, and a co-product from juice extraction, wherein the co-product comprises a number average particle size of between 0.1 and 2000 microns, a total polyphenol content of at least 2500 parts per million, a moisture content of between 70% and 85% by weight, and a maximum seed content of 5% by weight. As used herein, the term "juice drink" refers to a drink containing co-product, which provides at least a trace amount of juice. Optionally, the juice drink beverage further comprises juice added in an amount to provide between 2% and 30% by weight single strength juice. Typically, if the juice drink contains less than about 5% juice but comprises at least one fruit flavor, at least one vegetable flavor, or combinations thereof, it will meet the general classification of a juice beverage. The standard of identity brix values of specific juices are established by the FDA. The co-product optionally comprises a citrus pomace co-product, such as orange pomace co-product.

In certain embodiments, the juice drink product comprises juice (e.g., citrus juice, orange juice, etc.) in an amount from about 2% to about 30% by weight of the beverage product, such as about 5% to about 30% by weight, or about 2% to about 20% by weight, or about 2% to about 15% by weight, or about 2% to about 10% by weight.

In certain embodiments, water is added to the juice drink at a level of from about 0% to about 90% by weight of the beverage product, e.g., about 25% to about 90% by weight, about 40% to about 90% by weight, or about 65% to about 95% by weight.

In certain embodiments, the juice drink comprises between about 2% and about 30% by weight co-product, or between about 5% and about 25% by weight co-product, or between about 5% and about 20% by weight co-product, or between about 7% and about 20% by weight co-product, or between about 5% and about 15% by weight co-product, or between about 10% and about 20% by weight co-product.

In embodiments, the amounts of juice and co-product in the juice drink are inversely proportional. That is, the more co-product that is included in the juice drink, the less juice is included in the juice drink. Likewise, the less co-product that is included in the juice drink, the more juice is included in the juice drink. An advantage to incorporating greater amounts of co-product and less juice is that the juice extraction by-products from which the co-product is obtained are less expensive than most juices. In an aspect, the juice drink comprises at least 2.5 grams of fiber per 8 ounce serving, such as at least 5 grams of fiber per 8 ounce serving.

In certain embodiments, juice drinks comprise a viscosity between about 1 cP and about 100,000 cP, or between about 10 cP and about 100 cP, or between about 10 cP and about 90 cP, or between about 10 cP and about 80 cP, or between about 10 cP and about 70 cP, or between about 10 cP and about 50 cP, or between about 15 cP and about 90 cP, or between about 20 cP and about 90 cP. The viscosity may be measured using the ASTM WK31279 test method, for example, and employing a Brookfield rotary viscometer at a temperature of 25 degrees Celsius.

The fruits and vegetables from which the juice is obtained and from which the juice extraction by-products are obtained, may be independently selected from any suitable fruit or vegetable such as, but not limited to, carrot, cranberry, orange, blueberry, tomato, apple, lemons, limes, grapes, strawberries, grapefruits, tangerine, mandarin orange, tangelo, pomelo, celery, beet, lettuce, spinach, cabbage, artichoke, broccoli, brussels sprouts, cauliflower, watercress, peas, beans, lentils, asparagus, onions, leeks, kohlrabi, radish, turnip, rutabaga, rhubarb, carrot, cucumber, zucchini, eggplant, pineapple, peach, banana, pear, guava, apricot, watermelon, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, rowan, gooseberry, pomegranate, persimmon, mango, papaya, lychee, plum, prune, fig, or any combination thereof.

As discussed above, natural by-products from the extraction of juices from fruits and/or vegetables contain natural nutrients (such as vitamin A, vitamin C, vitamin E, phytonutrients such as polyphenols, and antioxidants), flavors, colors of the original fruits and vegetables, and large amounts of natural (e.g., un-processed) fibers. Most juice extraction by-product contains over 50% by weight (on a dry basis) of dietary fiber, mostly insoluble fiber. The use of pomace in food products will fortify fiber and naturally existing nutrients such as vitamins and antioxidants. Moreover, juice extraction by-products are generally low cost ingredients because they are under-utilized and considered a waste from juice industry.

Co-products according to embodiments of the invention may be obtained from any juice extraction processing method that produces side-stream ingredients. For example, by-products such as pomace may be obtained from the press cake after a juice extraction process; however, such by-products generally have a wide range of particle and fiber sizes with a significant amount being large particles. For example, particle or fiber sizes of juice extraction by-products may range from 100 microns to 5 centimeters depending upon the particular type of extracted fruit or vegetable. By-products containing larger particles and fiber, and/or a wide distribution of particle or fiber sizes do not have a smooth texture. Therefore, mixing such juice extraction by-products into beverage formulations provides a tough, sandy, and gritty texture, as well as a non-homogeneous dispersion in liquid-based products. For ease of discussion, the term "particle size" refers to both particle size and fiber size.

As used herein, the term "pomace" may also include the "goo" or the retentate formed from a filtration step of an extraction process, e.g., when clarifying a juice. This filtration retentate may be obtained as a by-product, for example, from any suitable fruit or vegetable juice such as carrot or cranberry juices. This retentate or goo may be added to pomace obtained from the press cake, for example, and is hereinafter is collectively referred to as pomace. Pomace (including filtration retentate) "as is" provides fiber, color, nutrients, mouthfeel, flavor.

It was discovered that juice extraction by-products may be treated to reduce the particle (including fiber) size resulting in improved texture and dispersion capability of the resulting co-product in a product. Comminution of juice extraction by-products releases components such as flavors, colors, and soluble carbohydrates, and the texture of the particles feels smoother than prior to comminution.

Any suitable form of juice extraction by-products, such as wet by-products or frozen by-products, may be used to obtain the desired co-product. Wet or frozen juice extraction by-products do not require rehydration, and wet by-products may be taken directly as the press cake or other form from the juice extraction processes. The moisture content of the by-products depends on the fruit or vegetable as they may vary on moisture content. Comminution, or size reduction, may occur through any suitable mechanical or chemical process such as micro-grinding, cutting, shredding, slicing, grinding, shearing, extruding, homogenizing, pulverizing, comminuting, or subjecting to ultrasonic frequency. In one aspect, the size reduction is achieved by micro-grinding.

Micro-grinding processes are typically used for pureeing portions of fruits and vegetables such as fruits and vegetables wherein the skin, seeds, etc. are removed. This process comprises feeding, grinding, and mesh-screening or filtering processes in a unit operation. Therefore, the outcome has more controlled and homogeneous size distribution than random grinding without mesh-screening process. The micro-grinding process provides a product which is very suitable for addition to food products, and in particular beverage products to provide high nutritional value. For further size reduction, the micro-ground product is, optionally, passed through pressurized homogenizers such as dairy or dipping sauce homogenizers as known by the skilled practitioner. Using microgrinders at different blade (coarse, medium, fine and super-fine) and blade tip speed (between 15-60 Hz) configurations fruit and vegetable products at different mouthfeel textures ranging in particle sizes between 0.1 to 2000 micro meters could be produced. The products produced by microgrinders could be made homogenous through the use of homogenizers operating between 1200 to 2500 psi pressures to form a smooth consistency product.

Ideally, the average particle sizes of the juice extraction by-products are reduced to between 1 micron and 2000 microns to provide a micro-ground product with a smooth texture and dispersibility, such as below 250 microns, while below 125 micron is recommended for the smoothest sensory result. In some examples, the particle size may be reduced to below 75 micron or below 38 micron. The range of 38 micron to 125 micron particularly improves both dispersion and mouthfeel characteristics in beverages.

The micro-grinding and homogenization processing conditions of juice extraction by-may be described using mass flow rates. According to embodiments of the invention, each of the micro-grinding and the optional homogenization processes are performed at a mass flow rate of between about 2 and about 200 gallons per minute, such as between about 2 and 100 gallons per minute, or between about 50 and about 200 gallons per minute, to obtain co-product having the desired average particle sizes. Mass flow rates are generally between 2 and 10 gallons per minute or 2 and 20 gallons per minute or between 2 and 35 gallons per minute. The pasteurizers in Bradenton have a mass flow rate of about 33 gallons per minute The mechanical grinding method appears to allow detection, by AOAC method, of fiber typically undetectable due to being entrapped in larger particles. Following micro-grinding and optional homogenization, the process for making the co-product comprises pasteurization. Pasteurization may also be performed on the co-product at a mass flow rate of between about 2 and about 200 gallons per minute. Pasteurization of the co-product provides microbial stability and allows the co-product to be employed in beverage and food products having an extended shelf life. Depending on the specific pasteurization conditions, at least some naturally occurring enzymes in the co-product will be deactivated during pasteurization. Highly heat-resistant enzymes, such as limonoid D-ring lactone hydrolase, for example, are less likely to become deactivated during pasteurization processes.

In another aspect of the invention, juice extraction by-products are prepared for freeze-shearing by adding water to the by-products. The amount of water depends on the type of fruit or vegetable from with the by-products were obtained. For example, cranberry pomace requires a 20:1 water:pomace ratio whereas blueberry pomace requires a 10:1 water to pomace ratio. The amount of water necessary to prepare the by-products for freeze shearing is easily determined by following the process outlined below in the examples. Essentially, sufficient water is added to form and maintain a vortex in a Vitamix or other suitable blender for about 5 minutes. When frozen, such hydrated by-products provide an ideal substrate for freeze shearing.

The mixture is then frozen at 0 to −20° C., for example −9° C., until suitably frozen, typically 12-20 hours. The frozen puree is then subjected to at least one cycle of shearing such as with the Pacojet shearing process. The result is a smooth frozen puree which, when eaten, exhibits little or no grittiness experienced with the untreated puree/slurry. Upon thawing at room temperature, a smooth, thick puree with the consistency of dairy pudding can be obtained. The continuous hydration and shear of the pomace increases viscosity and film forming ability. The unexpected result indicates shear and hydration can be used to slightly modify fruit or vegetable fiber to create a useful food ingredient.

The pH of the co-product will range from about 2.0 to about 14.0, such as from about 2.0 to about 10.0, or from about 2.0 to about 8.0, or from about 2.0 to about 6.0, or from about 2.0 to about 4.0.

The co-product may be used as main ingredients of fruit and vegetable beverage or food products or may be included in various beverage or food products to provide enhanced nutrition and other characteristics, such as color, flavor, and mouthfeel. Suitable food products include, but are not limited to beverages, soups, spreads, puddings, smoothies, snack foods, yogurts, and cereals.

The co-product may be used as a substitute for a combination of fruit juice or juice concentrate with a thickener (gum) because it can provide both fruit benefits and viscosity. The co-product may be added to various types of beverages such as fruit and or vegetable juices, fruit smoothies, fruit beverages and fruit cocktails. This will enhance natural fiber and phytochemical contents and increase viscosity, smoothness and mouthfeel.

As shown in the following table 1, various pomace ingredients (without treatment) are generally higher molecular weight and less soluble and dispersible than FIBERSOL-2 a modified corn starch by ADM or other common sources of fiber. However, treating pomace as described herein for juice extraction by-products to reduce the particle size provides pomace having increased solubility and greater nutritional value.

| Name | Chemical Composition | Soluble to Insoluble | Total Fiber (dry basis) | Other nutrients |
|---|---|---|---|---|
| Fibersol | Resistant Maltodextrin α and β glycoside linkage | Soluble | 100% | |
| Inulin | β-(2-1) fructosyl-fructose links | Soluble | 100% | |
| Pectin from Citrus | α-(1-4)-linked D-galacturonicacid | Soluble | 100% | |
| β-Glucan | D-glucose linked by β-glycosidicbonds | Short: soluble Long: insoluble | 75.1% (oat) | |
| Cranberry Pomace | Mainly β-(1-4) glucoside | 1:10 | 72.4% | Proanthocyanins |
| Cranberry Goo | Mainly β-(1-4) glucoside | 1:5 | 43% | Anthocyanins |
| Carrot Pomace | β-(1-4) glucoside, α-(1-4) galacturonic acid | 1:1 | 52.8% | Carotenoids Minerals |
| Orange Pomace | α-(1-4) galacturonic acid, β-(1-4) glucoside | 1:2 | 54% | Carotenoids, saponins, limonin |

Dietary fiber comprises the remnants of edible plants cells, polysaccharides, lignin, and associate substances (carbohydrates) resistant to (hydrolysis) digestion by alimentary enzymes of humans.

AOAC fiber analysis is used to detect the amount of fiber in a food ingredient. This is important so that the amount of dietary fiber may be accurately reported in an ingredient/nutritional content disclosure. In another aspect of the invention, the pomace is pre-heated to inactivate natural enzymes present in the fruits or vegetables ingredients present in the pomace. The pomace is pre-heated to a temperature of at least about 70° C., to about 100° C. The pre-heating occurs prior to AOAC fiber analysis to maximize the fiber detection and stabilize the pomace slurry. The heating may be done prior to particle size reduction, afterwards, both, or neither.

Juice beverages containing 100% juice are popular with consumers for numerous reasons, such as their nutritional profile and lack of added water. These juice beverages must meet particular standard of identity criteria. The US Food and Drug Administration sets a standard for food labeling, including juice labeling. 21 CFR Section 101.30 states that beverages containing "100 percent juice and non-juice ingredients that do not result in a diminution of the juice soluble solids or, in the case of expressed juice, in a change in the volume, when the 100 percent juice declaration appears on a panel of the label that does not also bear the ingredient statement, it must be accompanied by the phrase "with added _____," the blank filled in with a term such as "ingredient(s)," "preservative," or "sweetener," as appropriate (e.g., "100% juice with added sweetener"), except that when the presence of the non-juice ingredient(s) is declared as a part of the statement of identity of the product, this phrase need not accompany the 100 percent juice declaration." Consequently, since solids derived from a fruit or a vegetable are ingredients included within the standard of identity of the juice, fruit, or vegetable, the juice beverages of certain embodiments of the invention may be labeled as "100 percent juice." When some of the solids are not typically found in juice, the juice beverages of certain embodiments of the invention may be labeled as "100 percent fruit," or "100 percent vegetable," according to local laws and regulations.

According to certain embodiments, the type and amount of co-product is selected to be added to a juice to provide a finished beverage product that comprises at least as much of all of the nutrients provided by the same fruit or vegetable when consumed whole. For instance, a whole peeled orange usually contains about 3 grams of fiber, whereas an eight ounce glass of not-from-concentrate orange juice usually contains less than 1 gram of fiber. Thus, according to an embodiment of the invention, a juice beverage is prepared comprising not-from-concentrate orange juice to which sufficient co-product (obtained from orange juice extraction by-products) is added to provide a final beverage containing at least 3 grams of fiber.

An advantage of beverage products according to embodiments of the invention is that the products comprise the same or very close to the same level of nutrients as found in a whole fruit and/or vegetable, or even higher levels in the case of phytonutrients fond in the whole fruit and/or vegetable but are less perishable due to the pasteurization process; in some cases weeks or months of shelf life as opposed to days for some fresh fruit or vegetables, and are convenient to consume without any further preparation required, e.g., peeling, cutting, cooking, etc.

Not-from-concentrate (NFC) juices tend to be popular with consumers for numerous reasons, such as their fresh taste and nutritional profile. These NFC juices also must meet particular standard of identity criteria. Among these criteria are brix minimums and brix-to-acid ratio minimums. For example, the US Food and Drug Administration sets a standard for juices such as orange juice. In this regard 21 CFR Section 146.140, incorporated by reference hereinto, states that finished pasteurized orange juice is to contain not less than 10.5 percent by weight of orange juice soluble solids, exclusive of the solids of any added sweetening ingredients. This FDA regulation further states that the ratio of brix to grams of citric acid per 100 ml of juice is not less than a 10 to 1 ratio. The juice industry recognizes these criteria for pasteurized orange juice or single strength orange juice as applying to NFC orange juice. It will be understood that these standard of identity criteria are used herein with respect to NFC orange juice or pasteurized single strength orange juice. This same concept of standard of identity criteria applies as well to other pasteurized single strength juices. In certain embodiments, the juice beverages according to the current invention optionally meet the criteria of NFC juice.

In certain embodiments, a juice beverage is provided that comprises liquid derived from one or more fruits and/or vegetables and solids derived from one or more fruits and/or vegetables distinct from the source of the liquid. Juice derived from fruits and vegetables advantageously provide macro nutrition, micro nutrition, or combinations thereof, to compositions according to embodiments of the invention. The co-products provide fiber to the juice beverage, which can result in a greater feeling of satiety following consumption of the beverage, as compared to a typical juice beverage, and can better mimic the total nutritional benefit of eating whole fruit vs. juice.

It is also an advantage of certain aspects of the invention to provide an economical juice beverage comprising a combination of an inexpensive liquid as the bulk of the juice beverage with a co-product to provide nutrition and sensory attributes.

In certain embodiments, the juice beverage is a low carbohydrate or low sugar beverage, comprising a brix of between about 3 degrees and about 16 degrees. As used herein, the term "brix" refers to the percent of sucrose by weight, in grams per 100 milliliters of liquid. In other embodiments, the juice beverage comprises a brix of between about 4 degrees and about 12 degrees, or between about 5 degrees and about 9 degrees, or between about 6 degrees and about 8 degrees. In certain aspects of the invention, the juice beverage provides less than 100 calories per 8 ounce serving. In an embodiment of the invention, the juice beverage provides less than 80 calories per 8 ounce serving, or less than 70 calories per 8 ounce serving, or less than 60 calories per 8 ounce serving, or less than 50 calories per 8 ounce serving.

Liquids derived from one or more fruits, one or more vegetables, and combinations thereof, are a basic ingredient in the juice beverages disclosed here, typically being the vehicle or primary liquid portion in which the remaining ingredients are dissolved, emulsified, suspended or dispersed. Liquids suitable for use in at least certain exemplary embodiments of the beverage products disclosed here include, e.g., fruit, vegetable and berry juices. Liquids can be employed in the present invention in the form of a single-strength juice, NFC juice, 100% pure juice, juice concentrate, serum, clarified juice, fruit or vegetable water, clarified serum, or other suitable forms. The term "clarified" as used herein refers to a liquid that has had the solid matter removed using filtration or centrifugation. Typically, the filtration comprises removing solid matter as small as 0.1 microns in diameter. The term "serum" as used herein refers to the thin, clear portion of the fluid of plants, such as fruits or vegetables. The term "water" as used herein refers to the clear liquid extracted from fruits or vegetables. The term "juice" as used herein includes single-strength fruit (including berry) or vegetable juice, as well as concentrates, milks, and other forms. Multiple liquids derived from different fruits and/or vegetables can be combined to generate a juice beverage having the desired nutrients.

In alternative embodiments, juice beverages may be prepared that are not 100% juice. For example, juice beverages may comprise from concentrate (FC) juice, which is juice that has been previously concentrated to remove water, and then diluted to provide at least a minimum specified Brix, depending on the type of juice. Orange juice, for instance, must have a minimum Brix level of 11.8, while grapefruit juice must have a minimum Brix level of 10.0. Further embodiments include juice beverages comprising reduced calorie, light, or low-calorie juice. Such beverages typically comprise juice, added water, and often other added ingredients to provide a desired taste, such as non-nutritive sweeteners.

Suitable finishers are available from Brown International Corporation (Winter Haven, Fla.) or JBT Corporation (Chicago, Ill.). Finishers are also employed for separating seeds from the juice extraction by-products. The finisher screen is optionally modified such that instead of comprising typical circular openings, the finisher screen instead comprises slot openings oriented in the machine direction. Slots ranging from 1 to 5 inches in length in the machine direction and $\frac{1}{16}$ to $\frac{1}{4}$ inch in the cross-machine direction can be used. Such slot configurations have been unexpectedly discovered to allow improved yield of separation of seeds, as well as peel pieces, from the remainder of juice extraction by-products and also to minimize damage to the seeds during the removal process. Deseeding in this manner has improved yields from 25-40% to 70-95% recovery of deseeded pomace. Importantly, any damage to seeds can result in releasing undesired compounds, from the seeds, such as bitter tasting compounds. The use of a finisher screen comprising slot openings oriented in the machine direction allows achievement of co-products obtained from citrus juice extraction by-products having a combined peel and seed amount between 0.01% and 2.0% by weight, or between 0.01% and 1.0% by weight.

It should be understood that juice beverages and other juice beverage products in accordance with this disclosure may have any of numerous different specific formulations or constitutions. In general, an NFC and/or 100% fruit or vegetable beverage in accordance with this disclosure typically consists essentially of only fruit or vegetable liquid and co-product obtained from fruit or vegetable juice extract by-products. The formulation of a beverage product in accordance with this disclosure can vary to a certain extent, depending upon such factors as the product's intended market segment, its desired nutritional characteristics, flavor profile and the like.

For example, it will generally be an option to add further ingredients to the formulation of a particular beverage embodiment, including any of the beverage formulations described below in particular if the juice beverage is not required to meet a specific standard of identity. Additional (i.e., more and/or other) sweeteners may be added, flavorings, inclusions (e.g., fruit or vegetable pieces, fiber, oat flour or nuts), electrolytes, vitamins, proteins, stabilizers, phytonutrients, functional ingredients, tastants, masking agents and the like, flavor enhancers, and/or carbonation typically can be added to any such formulations to vary the taste, mouthfeel, nutritional characteristics, etc.

In embodiments for which the juice beverage is not 100% juice or is from concentrate, water may instead be the vehicle or primary liquid portion in which the remaining ingredients are included. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain embodiments, water is present at a level of from about 1% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids. The water is optionally carbonated water; the use of carbon dioxide is discussed further below.

Acid used in beverages disclosed here can serve any one or more of several functions, including, for example, providing antioxidant activity, lending tartness to the taste of the beverage, enhancing palatability, increasing thirst quenching effect, modifying sweetness and acting as a mild preservative by providing microbiological stability. Ascorbic acid, commonly referred to as "vitamin C", is often employed as an acidulant in beverages to also provide a vitamin to the consumer. Any suitable edible acid may be used, for example citric acid, malic acid, tartaric acid, phosphoric acid, ascorbic acid, lactic acid, formic acid, fumaric acid, gluconic acid, succinic acid and/or adipic acid.

The acid can be used in solid or solution form, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc. The amount of acid in the gel beverage concentrate may range from about 1.0% to about 2.5%, between about 1.5% and about 2.0%, or about 1.8% by weight of the gel beverage concentrate. In certain embodiments of the invention, all of the acid included in a beverage composition may be provided by citric acid.

The pH of at least certain exemplary embodiments of the beverages disclosed here can be a value within the range of 2.5 to 4.0. The acid in certain exemplary embodiments can enhance beverage flavor. Too much acid can impair the beverage flavor and result in sourness or other off-taste, while too little acid can make the beverage taste flat and reduce microbiological safety of the product. It will be within the ability of those skilled in the art, given the benefit of this disclosure, to select a suitable acid or combination of acids and the amounts of such acids for the acidulant component of any particular embodiment of the beverage products disclosed here.

Sweeteners suitable for use in various embodiments of the beverages disclosed here include nutritive and non-nutritive, natural and artificial or synthetic sweeteners. In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate and/or others. Typically, such sweeteners are present in a gel beverage concentrate in an amount of from about 0.5% to about 35% by weight, such as from about 15 to about 25% by weight. Further, such sweeteners are present in an amount of from about 0.1% to about 20% by weight of a finished beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

Suitable non-nutritive sweeteners and combinations of sweeteners are selected for the desired nutritional characteristics, taste profile for the beverage, mouthfeel and other organoleptic factors. Non-nutritive sweeteners suitable for at least certain exemplary embodiments include, but are not limited to, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain embodiments the sweetener comprises acesulfame potassium. Other non-nutritive sweeteners suitable for at least certain exemplary embodiments include, for example, *Stevia rebaudiana* extracts, rebaudioside A, rebaudioside D, sorbitol, mannitol, xylitol, glycyrrhizin, D-tagatose, erythritol, meso-erythritol, maltitol, maltose, lactose, fructo-oligosaccharides, Lo Han Guo powder, xylose, arabinose, isomalt, lactitol, maltitol, trehalose, and ribose, and protein sweeteners such as thaumatin, monellin, brazzein, L-alanine and glycine, related compounds, and mixtures of any of them. Lo Han Guo, *Stevia rebaudiana* extracts, rebaudioside A, and monatin and related compounds are natural non-nutritive potent sweeteners.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

Preservatives may be used in certain embodiments of the beverages disclosed here. That is, certain exemplary embodiments contain an optional dissolved preservative system. Solutions with a pH below 4.6 and especially those below 3 typically are "microstable," i.e., they resist growth of microorganisms, and so are suitable for longer term storage prior to consumption without the need for further preservatives. However, an additional preservative system can be used if desired. Furthermore, embodiments of juice beverages having low acidity generally comprise a preservative system. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoic acid, benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), lauryl arginate ester, cinnamic acid, e.g., sodium and potassium cinnamates, polylysine, and antimicrobial essential oils, dimethyl dicarbonate, and mixtures thereof, and antioxidants such as ascorbic acid, EDTA, BHA, BHT, TBHQ, EMIQ, dehydroacetic acid, ethoxyquin, heptylparaben, and combinations thereof.

Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure. In certain embodiments of the invention, sorbic acid or its salts (sorbates) may be employed as preservatives in the beverage products, such as in an amount of less than 0.1% by weight of a gel beverage concentrate.

Other methods of beverage preservation suitable for at least certain exemplary embodiments of the beverage products disclosed here, such as ready-to-drink beverages, include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

The beverage products disclosed here optionally contain a flavoring composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, pomegranate, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of the above-mentioned flavors. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Other flavorings suitable for use in at least certain exemplary embodiments of the beverage products disclosed here include, e.g., spice flavorings, such as mint, cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide can be used to provide effervescence to certain exemplary embodiments of the beverages disclosed here, such as nectar beverages, juice drinks, and frozen slush beverages, for instance. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $CO_2$ level up to about 7.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of water at 60° F. (16° C.) temperature and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

The juice beverages disclosed here may contain additional ingredients, including, generally, any of those typically found in beverage formulations. Examples of such additional ingredients include, but are not limited to, salt, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_3$ (nicotinamide), $B_4$ (adenine), $B_5$ (pantothenic acid, calcium), $B_6$ (pyridoxine HCl), $B_{12}$ (cyanocobalamin), and $K_1$ (phylloquinone), niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

Notwithstanding the claims, the invention is also defined by way of the following clauses:

Clause 1: A beverage comprising:
juice; and
a co-product from juice extraction, wherein the co-product comprises a number average particle size of between 0.1 and 2000 microns, a total polyphenol content of at least 2500 parts per million, a moisture content of between 70% and 85% by weight, and a combined peel and seed content between 0.01% and 20% by weight.

Clause 2: The beverage of clause 1, wherein the co-product comprises citrus pomace co-product.

Clause 3: The beverage of clause 1 or clause 2, wherein the juice comprises orange juice.

Clause 4: The beverage of any of clauses 1-3, wherein the beverage comprises at least 2.5 grams of fiber per 8 ounce serving.

Clause 5: The beverage of any of clauses 1-4, wherein the beverage comprises at least 5 grams of fiber per 8 ounce serving.

Clause 6: The beverage of any of clauses 1-5, wherein the co-product comprises between about 6% and about 20% by weight fiber, wherein the fiber of the co-product comprises both insoluble fiber and soluble fiber.

Clause 7: The beverage of clause 6, wherein the fiber of the co-product comprises a ratio of soluble fiber to insoluble fiber of about 1:2.

Clause 8: The beverage of clause 1-7, wherein the co-product comprises a number average particle size of between 1 and 250 microns.

Clause 9: The beverage of clause 1-8, wherein the co-product comprises at least 20 milligram vitamin C per 100 grams of the co-product.

Clause 10: The beverage of clause 2, wherein the co-product comprises Hamlin orange pomace co-product, Valencia orange pomace co-product, Pera orange pomace co-product, Navel orange pomace co-products, Parson Brown orange pomace co-product, Cara orange pomace co-product, Pineapple orange pomace co-product, or combinations thereof.

Clause 11: The beverage of any of clauses 1-10, wherein the co-product comprises a combined peel and seed content between 0.01% and 2% by weight.

Clause 12: The beverage of any of clauses 1-11, wherein the beverage consists essentially of not from concentrate orange juice, citrus pomace co-product, and at least one added flavor.

Clause 13: The beverage of any of clauses 1-12, wherein the polyphenols comprise hesperidin, limonin, narirutin, nobiletin, didymin, sinensetin, tangeretin, nomilin, or combinations of any of them.

Clause 14: The beverage of any of clauses 1-13, wherein the beverage comprises a viscosity between about 300 and about 3000 centipoises as measured using a Brookfield viscometer at 20 degrees Celsius.

Clause 15: The beverage of any of clauses 1-14, wherein the co-product comprises a juice extraction by-product of a fruit or vegetable selected from the group consisting of orange, apple, grapefruit, lemon, lime, grapes, cranberry, blueberry, peach, pear, pineapple, tomato, strawberry, tangerine, mandarin orange, tangelo pomelo, celery, beet, lettuce, spinach, cabbage, artichoke, broccoli, brussels sprouts, cauliflower, watercress, peas, beans, lentils, asparagus, onions, leeks, kohlrabi, radish, turnip, rutabaga, rhubarb, carrot, cucumber, zucchini, eggplant, banana, guava, apricot, watermelon, Saskatoon berry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, rowan, gooseberry, pomegranate, persimmon, mango, papaya, lychee, plum, prune, fig, and any combination thereof.

Clause 16: A method for making a beverage comprising:
preparing a co-product comprising:
obtaining a by-product from juice extraction;
removing seeds from the by-product;
reducing the particle size of the by-product by microgrinding, homogenizing, and combinations thereof; and
pasteurizing the co-product; and
adding the co-product to juice, wherein the co-product comprises a number average particle size of between 0.1 and 2000 microns, a total polyphenol content of at least 2500 parts per million, a moisture content of between 70% and 85% by weight, and a combined peel and seed content between 0.01% and 2% by weight.

Clause 17: The method of clause 16, wherein the co-product is citrus pomace co-product.

Clause 18: The method of clause 16 or 17, wherein the seeds are mechanically removed from the by-product.

Clause 19: The method of any of clauses 16-18, wherein the juice comprises orange juice.

Clause 20: A beverage comprising:
between 5% and 90% by weight juice;
added water;
at least one non-nutritive sweetener;
at least one flavor; and
a co-product from juice extraction, wherein the co-product comprises a number average particle size of between 0.1 and 2000 microns, a total polyphenol content of at least 2500 parts per million, a moisture content of between 70% and 85% by weight, and a combined peel and seed content between 0.01% and 20% by weight,
and wherein the beverage comprises a brix of between about 5 brix and about 9 brix.

Clause 21: The beverage of clause 20, wherein the juice comprises orange juice and the co-product comprises citrus pomace co-product.

Clause 22: The beverage of clause 20 or clause 21, wherein the beverage comprises 20-60% juice, 40-80% water, and 5-25% co-product.

Clause 23: The beverage of any of clauses 20-22, wherein the beverage comprises at least 2.5 grams of fiber per 8 ounce serving.

Clause 24: The beverage of clause 23, wherein the beverage comprises at least 5 grams of fiber per 8 ounce serving.

Clause 25: The beverage of any of clauses 20-24, wherein the co-product comprises between about 6% and about 15% by weight of total fiber, wherein the fiber of the co-product comprises both insoluble fiber and soluble fiber.

Clause 26: The beverage of clause 25, wherein the fiber comprises a ratio of soluble fiber to insoluble fiber of about 1:2.

Clause 27: The beverage of any of clauses 20-26, wherein the co-product comprises a number average particle size of between 1 and 250 microns.

Clause 28: The beverage of clause 21, wherein the co-product comprises at least 20 milligram vitamin C per 100 grams of co-product.

Clause 29: The beverage of any of clauses 20-28, wherein the co-product comprises Hamlin orange pomace co-product, Valencia orange pomace co-product, Pera orange pomace co-product, Navel orange pomace co-products, Parson Brown orange pomace co-product, Cara orange pomace co-product, Pineapple orange pomace co-product, or combinations thereof.

Clause 30: The beverage of any of clauses 20-29, wherein the co-product comprises a combined peel and seed content between 0.01% and 2% by weight.

Clause 31: The beverage of any of clauses 20-30, wherein the beverage comprises a viscosity between about 50 and about 1500 centipoises.

Clause 32: A beverage comprising:
water;
at least one sweetener;
at least one acidulant;
at least one flavor;
at least one colorant; and
a co-product from juice extraction, wherein the co-product comprises a number average particle size of between 0.1 and 2000 microns, a total polyphenol content of at least 2500 parts per million, a moisture content of between 70% and 85% by weight, and a combined peel and seed content between 0.01% and 20% by weight.

Clause 33: The beverage of clause 32, wherein the co-product comprises citrus pomace co-product.

Clause 34: The beverage of any of clauses 32-33, wherein the beverage comprises 65-95% water and 5-25% co-product.

Clause 35: The beverage of any of clauses 32-34, wherein the beverage comprises at least 2.5 grams of fiber per 8 ounce serving.

Clause 36: The beverage of clause 35, wherein the beverage comprises at least 5 grams of fiber per 8 ounce serving.

Clause 37: The beverage of any of clauses 32-36, wherein the co-product comprises between about 6% and about 15% by weight of total fiber, wherein the fiber of the co-product comprises both insoluble fiber and soluble fiber.

Clause 38: The beverage of clause 37, wherein the fiber comprises a ratio of soluble fiber to insoluble fiber of about 1:2.

Clause 39: The beverage of any of clauses 32-38, wherein the co-product comprises a number average particle size of between 1 and 250 microns.

Clause 40: The beverage of clause 33, wherein the co-product comprises at least 20 milligram vitamin C per 100 grams of co-product.

Clause 41: The beverage of clause 33, wherein the co-product comprises Hamlin orange pomace co-product, Valencia orange pomace co-product, Pera orange pomace co-product, Navel orange pomace co-products, Parson Brown orange pomace co-product, Cara orange pomace co-product, Pineapple orange pomace co-product, or combinations thereof.

Clause 42: the beverage of clause 33, wherein the co-product comprises a combined peel and seed content between 0.01% and 2% by weight.

Clause 43: The beverage of any of clauses 32-42, wherein the beverage comprises a viscosity between about 10 and about 90 centipoises.

Example 1

Typical amounts of nutrients provided by orange pomace co-products for both Hamlin oranges and Valencia orange were experimentally determined over the course of one orange growing season. The orange pomace co-products were prepared by removing inedible material from the orange pomace, micro-grinding the pomace until a number average particle size of less than about 250 microns was achieved, homogenizing the pomace, and pasteurizing the pomace. The pomace pre-blend was micronized using various blade configurations and blade tip speeds (ranging from 15 to 60 Hz). This micronized/microgrinded pomace pre-blend was next homogenized at pressures between 1200 to 2500 psi to form a homogenous smooth product of uniform consistency. The results of each of the early, prime and late season for Hamlin oranges and Valencia oranges are provided in Table 2 below.

| | Orange Pomace Co-Product | | | | | |
|---|---|---|---|---|---|---|
| | Varietal | | | | | |
| | Hamlin | | | Valencia | | |
| | Season | | | | | |
| | Early | Prime | Late | Early | Prime | Late |
| Moisture (%) | 79.3 | 82.0 | 78.6 | 78.6 | 72.4 | 76.5 |
| Insoluble fiber (%) | 5.5 | 4.2 | 6.1 | 6.3 | 8.5 | 6.9 |
| Soluble fiber (%) | 4.4 | 2.8 | 3.4 | 5.1 | 5.8 | 4.8 |
| Total Fiber (%) | 9.91 | 6.95 | 9.49 | 11.38 | 14.22 | 11.71 |
| Total Limonin (ppm) | 87.50 | 40.93 | 60.81 | 65.98 | 53.73 | 48.43 |
| Total Sugars (%) | 7.41 | 7.17 | 7.43 | 5.29 | 6.98 | 6.98 |
| PMF (ppm) | 6.51 | 2.60 | 12.71 | 8.37 | 6.02 | 11.26 |
| Vitamin C (mg/100 g) | 43.0 | 43.0 | 45.0 | 24.0 | 20.0 | 25.0 |
| Hesperidin (ppm) | 3727.0 | 2562.0 | 3539.0 | 3607.0 | 4380.0 | 4065.0 |

Example 2

Three 100% fruit products were prepared comprising not-from-concentrate orange juice (NFC OJ) with 10 weight percent, 15 weight percent, or 20 weight percent, of the juice replaced with wet basis orange pomace co-product (prepared according to the process of Example 3). The finished juice products were analyzed for brix, pH, titratable acid, viscosity, and shear rate. The formulations and measured characteristics are shown below in Table 3.

It can be seen from the results that the addition of orange pomace co-product provides an approximately exponential increase in measured viscosity, as increasing amount of the co-product added to NFC OJ from 10% to 15% by weight resulted in an increase in measured viscosity of 3.375 times, from 340 centipoises to 1147.5 centipoises. Similarly, increasing the amount of the co-product added to NFC OJ from 10% to 20% by weight resulted in an increase in measured viscosity of 10.16 times, from 340 centipoises to 3454.2 centipoises. The addition of orange pomace co-product also resulted in a small decrease of pH, an increase in brix, and an increase in titratable acid.

TABLE 3

100% Juice Products Containing Not-From-Concentrate Orange Juice and Orange Pomace Co-Product

| Examples Only | NFC OJ + 0% Pomace Co-Product | | NFC OJ + 10% Pomace Co-Product | | NFC OJ + 15% Pomace Co-Product | | NFC OJ + 20% Pomace Co-Product | |
|---|---|---|---|---|---|---|---|---|
| Ingredients | % wt | Lbs | % wt | Lbs | % wt | Lbs | % wt | lbs |
| NFC Orange Juice* | 100.0000% | 7.86 | 90.0000% | 7.86 | 85.0000% | 7.42 | 80.0000% | 6.99 |
| Orange Pomace | 0.0000% | 0.87 | 10.0000% | 0.87 | 15.0000% | 1.31 | 20.0000% | 1.75 |
| Total | 100.0000% | 8.74 | 100.0000% | 8.74 | 100.0000% | 8.74 | 100.0000% | 8.74 |
| Brix | | 12.00 | | 12.46 | | 12.62 | | 12.70 |
| pH | | 3.90 | | 3.97 | | 3.95 | | 3.71 |
| Titratable Acidy | | 0.65 | | 0.63 | | 0.66 | | 0.66 |
| Viscosity (cP) | | 16.00 | | 340.00 | | 1147.50 | | 3454.20 |
| Shear Rate (1/sec) | | 0.67 | | 1.90 | | 6.40 | | 19.27 |

*Note that juice source can also be From Concentrate.

Example 3

Nectar juice beverage products were prepared comprising not-from-concentrate orange juice (NFC OJ), water, sweetener, acidulant, vitamins, and flavor, containing 0, 5, 7.5, 10, and 15 weight percent, of orange pomace co-product. The orange pomace co-product was prepared according to the process of Example 3. The finished juice products were analyzed for brix, pH, titratable acid, viscosity, and shear rate. The formulations and measured characteristics are shown below in Table 4.

It can be seen from the results that the addition of greater amounts of orange pomace co-product provides to the nectar juice products increases the measured viscosity of the nectar juice product. As the pomace is added, the appearance of the nectar beverages become more turbid or hazy as the pomace brings significant "cloud". The consistency also increase as pomace level is increased e.g. looks more viscous and thicker texture, has more viscous mouthfeel similar to 100% juices and the nutritional content of the nectar also increases.

TABLE 4

Nectar Juice Products Containing Not-From-Concentrate Orange Juice and Orange Pomace Co-Product

| Examples Only | Nectar + 0% Pomace Co-Product | | Nectar + 5% Pomace Co-Product | | Nectar + 7.5% Pomace Co-Product | | Nectar + 10% Pomace Co-Product | | Nectar + 15% Pomace Co-Product | |
|---|---|---|---|---|---|---|---|---|---|---|
| Ingredients | % wt | grams | % wt | grams | % wt | grams | % wt | grams | % wt | grams |
| NFC Orange Juice* | 42.0545% | 168.22 | 37.0541% | 148.22 | 34.5545% | 138.22 | 32.0541% | 128.22 | 27.0545% | 108.22 |
| Orange Pomace | 0.0000% | 0.00 | 5.0000% | 20.00 | 7.5000% | 30.00 | 10.0000% | 40.00 | 15.0000% | 60.00 |
| Rebaudioside A | 0.0125% | 0.05 | 0.0125% | 0.05 | 0.0125% | 0.05 | 0.0125% | 0.05 | 0.0125% | 0.05 |
| Flavors | 0.0340% | 0.14 | 0.0340% | 0.14 | 0.0340% | 0.14 | 0.0340% | 0.14 | 0.0340% | 0.14 |
| Filtered Water | 57.1447% | 228.58 | 57.1447% | 228.58 | 57.1447% | 228.58 | 57.1447% | 228.58 | 57.1447% | 228.58 |
| Vitamin Premix | 0.0827% | 0.33 | 0.0827% | 0.33 | 0.0827% | 0.33 | 0.0827% | 0.33 | 0.0827% | 0.33 |
| Beta carotene 1% | 0.0226% | 0.09 | 0.0226% | 0.09 | 0.0226% | 0.09 | 0.0226% | 0.09 | 0.0226% | 0.09 |
| Potassium Citrate | 0.3085% | 1.23 | 0.3085% | 1.23 | 0.3085% | 1.23 | 0.3085% | 1.23 | 0.3085% | 1.23 |
| Orange Oil + Tocopherol | 0.0328% | 0.13 | 0.0328% | 0.13 | 0.0328% | 0.13 | 0.0328% | 0.13 | 0.0328% | 0.13 |
| Malic Acid | 0.1831% | 0.73 | 0.1831% | 0.73 | 0.1831% | 0.73 | 0.1831% | 0.73 | 0.1831% | 0.73 |
| Citric Acid | 0.1246% | 0.50 | 0.1246% | 0.50 | 0.1246% | 0.50 | 0.1246% | 0.50 | 0.1246% | 0.50 |
| Total | 100.0000% | 400.00 | 100.0000% | 400.00 | 100.0000% | 400.00 | 100.0000% | 400.00 | 100.0000% | 400.00 |
| Brix | | 6.03 | | 6.17 | | 6.19 | | 6.18 | | 6.15 |
| pH | | 3.91 | | 3.96 | | 3.98 | | 3.96 | | 3.99 |
| Titratable Acidity | | 0.60 | | 0.57 | | 0.57 | | 0.58 | | 0.56 |
| Viscosity (cP) | | 9.00 | | 21.00 | | 38.00 | | 66.00 | | 219.00 |
| Shear Rate (1/sec) | | 0.21 | | 0.50 | | 0.90 | | 1.57 | | 5.21 |

*Note that juice source can also be From Concentrate.

Example 4

Six juice drink beverages were prepared comprising water, sweetener, acidulant, flavor, color, from concentrate orange juice (FC OJ) and/or orange pomace co-product. The orange pomace co-product was prepared according to the process of Example 3. In particular, enough FC OJ was included to provide 20 percent by weight single strength orange juice for the control juice drink beverage, and three juice drink beverages were made in which 5 weight percent, 10 weight percent, or 15 weight percent, of the juice was replaced with orange pomace co-product. Additionally, one beverage was prepared in which all 20 weight percent of the juice was replaced with orange pomace co-product and one beverage was prepared in with 0% juice and 5 weight percent orange pomace co-product. The finished juice drink beverages were analyzed for brix, pH, titratable acid, viscosity, and shear rate. The complete formulations and measured characteristics are shown below in Table 5.

It can be seen from the results that the addition of orange pomace co-product provides an increase in each of measured viscosity, shear rate, acidity, brix, and pH. Increasing amount of the co-product added to the juice drink beverages from 10% to 15% by weight resulted in an increase in measured viscosity of 2 times, from 16.1 centipoises to 32.2 centipoises. Similarly, increasing the amount of the co-product added from 10% to 20% by weight resulted in an increase in measured viscosity of 5.37 times, from 16.1 centipoises to 86.4 centipoises. The influence on measured viscosity by the addition of orange pomace co-product to a juice drink beverage that contained about 72 percent by weight water was significantly less than the influence on measured viscosity by the addition of orange pomace co-product to NFC OJ. As the pomace is added, the appearance of the juice drink beverages become more turbid or hazy as the pomace brings significant "cloud". The beverages' also become more orange in color. The beverages appearance also increases in the level of "particulates" or fine pomace/pulp as the pomace material is added. The consistency also increase as pomace level is increased e.g. looks more viscous and thicker texture. The mouthfeel of the juice drink containing the pomace material also increase to be more viscous, the overall nutrition of the finished juice drink also increases.

TABLE 5

Juice Drink Products Containing FC Orange Juice and Orange Pomace Co-Product

| Description | Juice Drink with 20% Orange Juice (Control) | | Juice Drink with 15% Orange Juice & 5% pomace co-product | | Juice Drink with 10% Orange Juice & 10% pomace co-product | |
|---|---|---|---|---|---|---|
| Ingredients | % wt. | Grams | % wt. | Grams | % wt. | Grams |
| Orange Juice (FC) to Single Strength | 20.0000 | 100.00 | 15.0000 | 75.00 | 10.0000 | 50.00 |
| Orange Pomace | 0.0000 | 0.00 | 5.0000 | 25.00 | 0.0000 | 50.00 |
| Citric Acid | 0.2000 | 1.00 | 0.2000 | 1.00 | 0.2000 | 1.00 |
| Ascorbic Acid | 0.0500 | 0.25 | 0.0500 | 0.25 | 0.0500 | 0.25 |
| Sucrose | 7.8000 | 39.00 | 7.8000 | 39.00 | 7.8000 | 39.00 |
| Orange flavors | 0.0450 | 0.23 | 0.0450 | 0.23 | 0.0450 | 0.23 |
| Beta Carotene 10% | 0.0030 | 0.02 | 0.0030 | 0.02 | 0.0030 | 0.02 |
| Filtered water | 71.9020 | 359.51 | 71.9020 | 359.51 | 71.9020 | 359.51 |
| Total | 100.0000 | 500.0000 | 100.0000 | 500.0000 | 100.0000 | 500.0000 |
| Brix | | 9.51 | | 9.67 | | 9.86 |
| pH | | 3.15 | | 3.43 | | 3.48 |
| Titratable Acidity | | 0.35 | | 0.36 | | 0.37 |
| Viscosity (cP) | | 10.10 | | 10.50 | | 16.10 |
| Shear Rate (1/sec) | | 0.06 | | 0.06 | | 0.10 |

| Description | Juice Drink with 5% Orange Juice & 15% pomace co-product | | Juice Drink with 0% Orange Juice & 20% pomace co-product | | Juice Drink with 0% Orange Juice & 5% pomace co-product | |
|---|---|---|---|---|---|---|
| Ingredients | % wt. | Grams | % wt. | Grams | % wt. | Grams |
| Orange Juice (FC) to Single Strength | 5.0000 | 25.00 | 0.0000 | 0.00 | 0.0000 | 0.00 |
| Orange Pomace | 15.0000 | 75.00 | 20.0000 | 100.00 | 5.0000 | 25.00 |
| Citric Acid | 0.2000 | 1.00 | 0.2000 | 1.00 | 0.2500 | 1.25 |
| Ascorbic Acid | 0.0500 | 0.25 | 0.0500 | 0.25 | 0.1000 | 0.50 |
| Sucrose | 7.8000 | 39.00 | 7.8000 | 39.00 | 9.2000 | 46.00 |
| Orange flavors | 0.0450 | 0.23 | 0.0450 | 0.23 | 0.0550 | 0.28 |
| Beta Carotene 10% | 0.0030 | 0.02 | 0.0030 | 0.02 | 0.0040 | 0.02 |
| Filtered water | 71.9020 | 359.51 | 71.9020 | 359.51 | 85.3910 | 426.96 |
| Total | 100.0000 | 500.0000 | 100.0000 | 500.0000 | 100.0000 | 500.0000 |
| Brix | | 10.03 | | 10.20 | | 10.47 |
| pH | | 3.51 | | 3.55 | | 2.83 |
| Titratable Acidity | | 0.39 | | 0.40 | | 0.31 |
| Viscosity (cP) | | 32.20 | | 86.40 | | 12.00 |
| Shear Rate (1/sec) | | 0.19 | | 0.40 | | 0.28 |

Example 5

The effect on various characteristics of NFC OJ by the addition of different amounts of orange pomace co-product was measured. A sufficient amount of orange pomace co-product was added to samples of NFC OJ to provide each of 0, 1, 2, 3, 4, 5, 6, and 7 grams of fiber per eight ounce serving of the final juice. The effects on brix, pH, acid, measured viscosity, shear rate, and amount of sinking pulp were measured and are shown below in Table 6.

It can be seen from Table 6 that the addition of orange pomace co-product increases brix, sinking pulp, shear rate, and viscosity, while the pH either does not change or increases very slightly and the amount of acid either does not change or decreases slightly. Similar to Example 4 above, the effect of added orange pomace co-product on measured viscosity is not linear, but rather approximately exponential, as shown in the graph of FIG. 1.

TABLE 6

100% Fruit Products Containing Not-From-Concentrate Orange Juice and Orange Pomace Co-Product

| Variable | Fiber (g/serv) | Brix | pH | Acid | Viscosity (cP) | Shear Rate (1/sec) | Sinking Pulp | DV %** |
|---|---|---|---|---|---|---|---|---|
| 1 | 0 | 12.04 | 3.999 | 0.68 | 25 | 0.14 | 11% to 14% | 0 |
| 2 | 1 | 12.16 | 3.883 | 0.67 | 90 | 0.50 | 20% | 4 |
| 3 | 2 | 12.27 | 4.039 | 0.66 | 260 | 1.45 | n/a | 8 |
| 4 | 3 | 12.41 | 4.101 | 0.64 | 718 | 4.00 | 20% | 12 |
| 5 | 4 | 12.64 | 4.068 | 0.61 | 1725 | 9.63 | 20% | 16 |
| 6 | 5 | 12.83 | 4.031 | 0.69 | 3543* | 19.77 | n/a | 20 |
| 7 | 6 | 13.21 | 3.972 | 0.63 | 5855 | 31.56 | 0%*** | 24 |

*Viscosity was measured using a Spindle #4 at 20 rpm; all other samples were measured using a Spindle #3 at 20 rpm.
**Daily Values (DV) based on a caloric intake of 2000 calories.
*** Pulp delineation was not visible, thus sinking pulp could not be determined.
"n/a" means no sinking pulp delineation was observed.

Example 6

Juices, nectars, and juice drinks, in which the base liquid is a juice from concentrate or not from concentrate orange juice, are prepared and tasted. Similar to Examples above, the addition of co-product to other juices provides a perceptible visible effect and enhanced mouthfeel to the finished beverage.

Example 7

Four gallons of cranberry fine pomace were mixed with cranberry juice. One part of this material was mixed with four parts concentrated juice and water (16 gallons). The resulting slurry was subjected to three steps of reduction. Step one used the 212084-1 microcut head for 125 micron product which step produced about 4" of "foam" on top of the cranberry liquid. The result indicated a good reduction of fine cranberry pulp with cranberry "skins".

Step two further processed the step one product into a 21608-1 microcut head for 75 micron product. Not much foam was produced in step two. The result indicated a good further reduction of cranberry pulp was accomplished in this step.

Step three further processed the step two product through a 216084 microcut head for 35 micron product. Almost no foam was produced in the last step. The result indicated a good final reduction of cranberry pulp in cranberry juice/water.

Example 8

900 pounds of oranges were extracted using a Brown Extractor. The trough juice was collected and sent to a paddle finisher outfitted with a ⅜" paddle pitch and screens with slotted holes punched of a size 2" in the machine direction and 5/32" in the cross-machine direction with ½" centers. The trough juice was pumped to the paddle finisher at a rate of 23.4 gallons per minute. The paddle was set to a rotational speed of 650 RPMs. The juice was finished in the paddle, collected, and then sent to a standard screw finisher. The standard screw finisher was set to a speed of 1200 RPMs and outfitted with a 0.020" screen. Juice and pomace from this run condition were found to have limonin levels at or below those from a standard screw-finished only process. The deseeded pomace yield was found to be 74%.

Given the benefit of the above disclosure and description of exemplary embodiments, it will be apparent to those skilled in the art that numerous alternate and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

We claim:

1. A beverage comprising:
   juice; and
   a co-product from juice extraction, wherein the co-product comprises a number average particle size of between 0.1 and 2000 microns, a total polyphenol content of at least 2500 parts per million, a moisture content of between 70% and 85% by weight, and a combined peel and seed content between 0.01% and 20% by weight; and
   wherein a viscosity of 8 ounces of the beverage comprising at least 10 wt % of the co-product is at least 300 cps at 25° C.

2. The beverage of claim 1, wherein the co-product comprises citrus pomace co-product.

3. The beverage of claim 2, wherein the juice comprises orange juice.

4. The beverage of claim 1, wherein the viscosity of 8 ounces of the beverage comprising about 15 wt % of the co-product is about 1100 cps at 25° C.

5. The beverage of claim 1, wherein the co-product comprises between about 6% and about 20% by weight fiber, wherein the fiber of the co-product comprises both insoluble fiber and soluble fiber.

6. The beverage of claim 5, wherein the fiber of the co-product comprises a ratio of soluble fiber to insoluble fiber of about 1:2.

7. The beverage of claim 1, wherein the co-product comprises a combined peel and seed content between 0.01% and 2% by weight.

8. The beverage of claim 1, wherein 8 ounces of the beverage comprising about 10 wt % of the co-product further comprises at least 2 grams of fiber.

9. The beverage of claim 1, wherein the viscosity of 8 ounces of the beverage comprising about 20 wt % of the co-product is about 3400 cps at 25° C.

10. The beverage of claim 9, wherein 8 ounces of the beverage comprising about 20 wt % of the co-product further comprises at least 5 grams of fiber.

* * * * *